United States Patent
Abarra et al.

(10) Patent No.: US 6,753,101 B1
(45) Date of Patent: *Jun. 22, 2004

(54) MAGNETIC RECORDING MEDIUM, MAGNETIC STORAGE APPARATUS, RECORDING METHOD AND METHOD OF PRODUCING MAGNETIC RECORDING MEDIUM

(75) Inventors: E. Noel Abarra, Kawasaki (JP); Iwao Okamoto, Kawasaki (JP); Yoshifumi Mizoshita, Kawasaki (JP); Yuki Yoshida, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/588,850

(22) Filed: Jun. 6, 2000

Related U.S. Application Data

(63) Continuation-in-part of application No. 09/425,788, filed on Oct. 22, 1999.

(30) Foreign Application Priority Data

Jun. 8, 1999 (JP) .............................. 11-161329
Apr. 7, 2000 (JP) ........................ 2000-107075

(51) Int. Cl.[7] .............................. G11B 5/66; G11B 5/70
(52) U.S. Cl. ......................... 428/694 TM; 428/694 TS; 428/212; 428/336; 428/900; 427/192.15; 427/192.2
(58) Field of Search ....................... 428/694 TM, 336, 428/694 TS, 212, 900; 704/192.15, 192.2

(56) References Cited

U.S. PATENT DOCUMENTS

| | | | |
|---|---|---|---|
| 4,677,032 A | 6/1987 | Robinson | 428/611 |
| 4,789,598 A | 12/1988 | Howard et al. | 428/408 |
| 5,051,288 A | 9/1991 | Ahlert et al. | 428/64 |
| 5,147,732 A | 9/1992 | Shiroishi et al. | 428/668 |
| 5,408,377 A | 4/1995 | Gurney et al. | 360/113 |
| 5,462,796 A | 10/1995 | Teng et al. | 428/336 |
| 5,465,185 A | 11/1995 | Heim et al. | 360/113 |
| 5,493,465 A | 2/1996 | Kamiguchi et al. | 360/113 |

(List continued on next page.)

FOREIGN PATENT DOCUMENTS

| | | |
|---|---|---|
| DE | 197 00 506 A1 | 7/1997 |
| EP | 0892393 | 1/1999 |
| GB | 2355018 | 4/2001 |
| JP | 06-349047 | 12/1994 |
| JP | 07-121863 | 5/1995 |
| JP | 07-134820 | 5/1995 |
| JP | 07-176027 | 7/1995 |
| JP | 08-129738 | 5/1996 |
| JP | 09-147349 | 6/1997 |
| JP | 09-198641 | 7/1997 |
| JP | 10-040528 | 2/1998 |
| JP | 10-149526 A | 6/1998 |
| JP | 10-289434 | 10/1998 |
| JP | 11328646 | 11/1999 |
| WO | 9624927 | 8/1996 |
| WO | 9734295 | 9/1997 |

OTHER PUBLICATIONS

Baibich et al., "*Giant Magnetoresistance of (001)Fe(001)CR Magnetic Superlattices*," Physical Review Letters, vol. 61, No. 21, Nov. 21, 1988.

(List continued on next page.)

*Primary Examiner*—Holly Rickman
(74) *Attorney, Agent, or Firm*—Greer, Burns & Crain, Ltd.

(57) ABSTRACT

A magnetic recording medium is provided with at least one exchange layer structure, and a magnetic layer formed on the exchange layer structure. The exchange layer structure includes a ferromagnetic layer and a non-magnetic coupling layer provided on the ferromagnetic layer and under the magnetic layer.

33 Claims, 22 Drawing Sheets

U.S. PATENT DOCUMENTS

| | | | |
|---|---|---|---|
| 5,523,173 A | 6/1996 | Doerner et al. | 428/611 |
| 5,580,667 A | 12/1996 | Lal et al. | 428/610 |
| 5,607,740 A | 3/1997 | Noda | 428/65.3 |
| 5,688,380 A | 11/1997 | Koike et al. | 204/192.2 |
| 5,693,426 A | 12/1997 | Lee et al. | 428/611 |
| 5,701,223 A | 12/1997 | Fontana, Jr. et al. | 360/113 |
| 5,736,262 A | 4/1998 | Ohkijima et al. | 428/611 |
| 5,756,202 A | 5/1998 | Van Kesteren et al. | 428/332 |
| 5,834,111 A | 11/1998 | Lal et al. | 428/332 |
| 5,840,394 A | 11/1998 | Ranjan et al. | 428/65.3 |
| 5,843,569 A | 12/1998 | Kaitsu et al. | 428/323 |
| 5,851,643 A | 12/1998 | Honda et al. | 428/212 |
| 5,851,656 A | 12/1998 | Ohkubo | 428/332 |
| 5,898,549 A | 4/1999 | Gill | 360/113 |
| 5,922,456 A | 7/1999 | Tanahashi et al. | 428/332 |
| 5,954,927 A * | 9/1999 | Kobayashi et al. | 204/192.2 |
| 6,013,365 A | 1/2000 | Dieney et al. | 428/332 |
| 6,077,586 A | 6/2000 | Bian et al. | 428/65.3 |
| 6,143,388 A | 11/2000 | Bian et al. | 428/65.3 |
| 6,150,016 A | 11/2000 | Song et al. | 428/332 |
| 6,221,481 B1 | 4/2001 | Wu et al. | 428/332 |
| 6,248,395 B1 | 6/2001 | Homola et al. | 427/129 |
| 6,280,813 B1 | 8/2001 | Carey et al. | 428/65.3 |
| 2001/0038931 A1 | 11/2001 | Carey et al. | 428/694 |

OTHER PUBLICATIONS

Lambert et al., "Reduction of Media Noise in Thin Film Metal Media by Lamination," IEEE Transactions on Magnetics, vol. 26, No. 5, Sep. 1990, pp. 2706–2708.

Murdock et al., "Noise Properties of Multilayered Co–Alloy Magnetic Recording Media," IEEE Transactions on Magnetics, vol. 26, No. 5, Sep. 1990, pp. 2700–2705.

Murayama et al., "Interlayer Exchange Coupling in Co/Cr/Co Double–Layered Recording Films Studied by SpinWave Brillouin Scattering," IEEE Transactions on Magnetics, vol. 27, No.6, Nov. 1991, pp. 5064–5066.

Lambert et al., "Laminated Media for High Density Recording," IEEE Transactions on Magnetics, vol. 29, No. 1, Jan. 1993, pp. 223–229.

Teng et al., "Flash Chromium Interlayer for High Performance Disks with Superior Noise and Coercivity Squareness," IEEE Transactions on Magnetics (1993), pp. 3679–3681.

Parkin et al., "Oscilliations in Exchange Coupling and Magnetoresistance in Metallic Superlattice Structures: Co/Ru, Co/Cr, and Fe/Cr," Physical Review Letters, vol. 64, No. 19, May 7, 1990, pp. 2304–2307.

Okamoto et al.; "Rigid Disk Medium for 5 Gb/in$^2$ Recording;" *IEEE Intermag 1996 Digest*.

Hosoe et al.; "Experimental Study of Thermal Decay in High–Density Magnetic Recording Media;" *IEEE Trans. Magn.*; vol. 33, p. 1528; 1997.

Lu et al.; "Thermal Instability at 10 Gb/in$^2$ Magnetic Recording;" *IEEE Trans. Magn.*; vol. 30, No. 6, pp. 4230–4232; Nov. 1994.

Abarra et al.; "Thermal Stability of Narrow Track Bits in a 5 Gb/in$^2$ Medium;" *IEEE Trans. Magn.*; vol. 33, p. 2995; 1997.

He et al.; "High–Speed Switching in Magnetic Recording Media;" *Journal of Magnetism and Magnetic Materials*; vol. 155, pp. 6–12; 1996.

Akimoto et al.; "Relationship Between Magnetic Circumferential Orientation and Magnetic Thermal Stability;" *J. Magn. Magn. Mater.*; 1999.

Abarra et al.; "The Effect of Orientation Ratio on the Dynamic Coercivity of Media for >15 5 Gb/in$^2$ Recording;" EB–02, *Intermag.*; Korea; 1999.

Richter et al.; "Dynamic Coercivity Effects in Thin Film Media;" *IEEE Trans. Magn.*, vol. 34, p. 1540; 1997.

Lu et al.; "Magnetic Viscosity in High–Density Recording;" *J. Appl. Phys.*, vol. 75, p. 5768; 1994.

S.S.P. Parkin; "Systematic Variation of the Strength and Oscillation Period of Indirect Magnetic Exchange Coupling Through the 3d, 4d, and 5d Transition Metals;" *Phys. Rev. Lett.*, Vol 67, p. 3598; 1991.

Pu–Ling Lu and Stanley H. Charap; "High Density Magnetic Recording Media Design and Indentification: Susceptibilty to Thermal Decay" *IEEE Transactions on Magnetics*, vol. 31, No. 6; Nov. 1995.

Y, Kawato et al.; "Spin Valve Films with Synthetic Ferrimagnets (Co/Ru/Co) for Pinned Layers;" (source and year unknown).

Akopyan et al., "Study Of A Change In The Lattice Constant Of A Ruthenium–Based Ternary Solid Solution By Mathematical Planning Of An Experiment," Izv. Akad. Nauk SSR, Met., (1976) (3), 210–214.

Ounadjela et al., "Field–Dependent Antiferro–Ferromagnetic Transition In Co/Ru Superlattices," J. Appl. Phys., Nov. 15, 1991, vol. 70, Issue 10, p. 5877.

* cited by examiner

MAGNETIC RECORDING MEDIUM, MAGNETIC STORAGE APPARATUS, RECORDING METHOD AND METHOD OF PRODUCING MAGNETIC RECORDING MEDIUM

This application is a Continuation-In-Part Application of a U.S. patent application Ser. No. 09/425,788 filed Oct. 22, 1999 pending.

BACKGROUND OF THE INVENTION

1. Field of the Invention

The present invention generally relates to magnetic recording media and magnetic storage apparatuses, and more particularly to a magnetic recording medium and a magnetic storage apparatus which are suited for high-density recording. The present invention also relates to a recording method for magnetically recording information on a magnetic recording medium, and to a method of producing such a magnetic recording medium.

2. Description of the Related Art

The recording density of longitudinal magnetic recording media, such as magnetic disks, has been increased considerably, due to the reduction of medium noise and the development of magnetoresistive and high-sensitivity spin-valve heads. A typical magnetic recording medium is comprised of a substrate, an underlayer, a magnetic layer, and a protection layer which are successively stacked in this order. The underlayer is made of Cr or a Cr-based alloy, and the magnetic layer is made of a Co-based alloy.

Various methods have been proposed to reduce the medium noise. For example, Okamoto et al., "Rigid Disk Medium For 5 Gbit/in$^2$ Recording", AB-3, Intermag '96 Digest proposes decreasing the grain size and size distribution of the magnetic layer by reducing the magnetic layer thickness by the proper use of an underlayer made of CrMo, and a U.S. Pat. No. 5,693,426 proposes the use of an underlayer made of NiAl. Further, Hosoe et al., "Experimental Study of Thermal Decay in High-Density Magnetic Recording Media", IEEE Trans. Magn. Vol.33, 1528 (1997), for example, proposes the use of an underlayer made of CrTiB. The underlayers described above also promote c-axis orientation of the magnetic layer in a plane which increases the remanence magnetization and the thermal stability of written bits. In addition, proposals have been made to reduce the thickness of the magnetic layer, to increase the resolution or to decrease the transition width between written bits. Furthermore, proposals have been made to decrease the exchange coupling between grains by promoting more Cr segregation in the magnetic layer which is made of the CoCr-based alloy.

However, as the grains of the magnetic layer become smaller and more magnetically isolated from each other, the written bits become unstable due to thermal activation and to demagnetizing fields which increase with linear density. Lu et al., "Thermal Instability at 10 Gbit/in$^2$ Magnetic Recording", IEEE Trans. Magn. Vol.30, 4230 (1994) demonstrated, by micromagnetic simulation, that exchange-decoupled grains having a diameter of 10 nm and ratio $K_uV/k_BT\sim60$ in 400 kfci di-bits are susceptible to significant thermal decay, where $K_u$ denotes the magnetic anisotropy constant, V denotes the average magnetic grain volume, $k_B$ denotes the Boltzmann constant, and T denotes the temperature. The ratio $K_uV/k_BT$ is also referred to as a thermal stability factor.

It has been reported in Abarra et al., "Thermal Stability of Narrow Track Bits in a 5 Gbit/in$^2$ Medium", IEEE Trans. Magn. Vol.33, 2995 (1997) that the presence of intergranular exchange interaction stabilizes written bits, by MFM studies of annealed 200 kfci bits on a 5 Gbit/in$^2$ CoCrPtTa/CrMo medium. However, more grain decoupling is essential for recording densities of 20 Gbit/in$^2$ or greater.

The obvious solution has been to increase the magnetic anisotropy of the magnetic layer. But unfortunately, the increased magnetic anisotropy places a great demand on the head write field which degrades the "overwrite" performance which is the ability to write over previously written data.

In addition, the coercivity of thermally unstable magnetic recording medium increases rapidly with decreasing switching time, as reported in He et al., "High Speed Switching in Magnetic Recording Media", J. Magn. Magn. Mater. Vol.155, 6 (1996), for magnetic tape media, and in J. H. Richter, "Dynamic Coervicity Effects in Thin Film Media", IEEE Trans. Magn. Vol.34, 1540 (1997), for magnetic disk media. Consequently, the adverse effects are introduced in the data rate, that is, how fast data can be written on the magnetic layer and the amount of head field required to reverse the magnetic grains.

On the other hand, another proposed method of improving the thermal stability increases the orientation ratio of the magnetic layer, by appropriately texturing the substrate under the magnetic layer. For example, Akimoto et al., "Relationship Between Magnetic Circumferential Orientation and Magnetic Thermal Stability", J. Magn. Magn. Mater. vol.193, pp.240–242(1999), report through micromagnetic simulation, that the effective ratio $K_uV/k_BT$ is enhanced by a slight increase in the orientation ratio. This further results in a weaker time dependence for the coercivity which improves the overwrite performance of the magnetic recording medium, as reported in Abarra et al., "The Effect of Orientation Ratio on the Dynamic Coercivity of Media for >15 Gbit/in$^2$ Recording", IEEE Trans. Magn. vol.35, pp.2709–2711, 1999.

Furthermore, keepered magnetic recording media have been proposed for thermal stability improvement. The keeper layer is made up of a magnetically soft layer parallel to the magnetic layer. This soft layer can be disposed above or below the magnetic layer. Oftentimes, a Cr isolation layer is interposed between the soft layer and the magnetic layer. The soft layer reduces the demagnetizing fields in written bits on the magnetic layer. However, coupling the magnetic layer to a continuously-exchanged coupled soft layer defeats the purpose of decoupling the grains of the magnetic layer. As a result, the medium noise increases.

Various methods have been proposed to improve the thermal stability and to reduce the medium noise. However, there was a problem in that the proposed methods do not provide a considerable improvement of the thermal stability of written bits, thereby making it difficult to greatly reduce the medium noise. In addition, there was another problem in that some of the proposed methods introduce adverse effects on the performance of the magnetic recording medium due to the measures taken to reduce the medium noise.

More particularly, in order to obtain a thermally stable performance of the magnetic recording medium, it is conceivable to (i) increase the magnetic anisotropy constant $K_u$, (ii) decrease the temperature T or, (iii) increase the grain volume V of the magnetic layer. However, measure (i) increases the coercivity, thereby making it more difficult to write information on the magnetic layer. In addition, measure (ii) is impractical since in magnetic disk drives, for example, the operating temperature may become greater than 60° C. Furthermore, measure (iii) increases the medium noise as described above. As an alternative for measure (iii), it is conceivable to increase the thickness of the magnetic layer, but this would lead to deterioration of the resolution.

SUMMARY OF THE INVENTION

Accordingly, it is a general object of the present invention to provide a novel and useful magnetic recording medium, magnetic storage apparatus, recording method and method of producing magnetic recording medium, in which the problems described above are eliminated.

Another and more specific object of the present invention is to provide a magnetic recording medium, a magnetic storage apparatus, a recording method and a method of producing a magnetic recording medium, which can improve the thermal stability of written bits without increasing the medium noise, so as to enable reliable high-density recording without introducing adverse effects on the performance of the magnetic recording medium, that is, unnecessarily increasing the magnetic anisotropy.

Still another object of the present invention is to provide a magnetic recording medium comprising at least one exchange layer structure, and a magnetic layer formed on said exchange layer structure, where said exchange layer structure comprises a ferromagnetic layer, and a non-magnetic coupling layer provided on said ferromagnetic layer and under said magnetic layer. According to the magnetic recording medium of the present invention, it is possible to provide a magnetic recording medium which can improve the thermal stability of written bits, so as to enable reliable high-density recording without degrading the overwrite performance.

A further object of the present invention is to provide a magnetic recording medium comprising a substrate, an underlayer disposed above said substrate, and a magnetic layer structure including at least a bottom ferromagnetic layer provided on the underlayer and having a remanent magnetization and thickness product $Mr_i\delta_i$, and a top ferromagnetic layer disposed above the bottom ferromagnetic layer and having a remanent magnetization and thickness product $Mr_j\delta_j$, wherein a relationship $Mr\delta \approx \Sigma(Mr_i\delta_i - Mr_j\delta_j)$ is satisfied, where $Mr\delta$ denotes a total remanent magnetization and thickness product of the magnetic layer structure, such that magnetization directions of adjacent ferromagnetic layers in the magnetic layer structure are closely antiparallel.

Another object of the present invention is to provide a magnetic storage apparatus comprising at least one magnetic recording medium described above. According to the magnetic storage apparatus of the present invention, it is possible to provide a magnetic storage apparatus which can improve the thermal stability of written bits, so as to enable a reliable high-density recording without introducing adverse effects on the performance of the magnetic recording medium.

Still another object of the present invention is to provide a method of magnetically recording information on a magnetic recording medium, comprising a step of switching magnetization direction of at least one of ferromagnetic layers which form a magnetic layer structure of the magnetic recording medium and have antiparallel magnetization directions.

A further object of the present invention is to provide a method of producing a magnetic recording medium having a substrate, an underlayer and a magnetic layer structure, comprising the steps of (a) forming the magnetic layer structure to include at least a bottom ferromagnetic layer provided on the underlayer and having a remanent magnetization and thickness product $Mr_i\delta_i$, and a top ferromagnetic layer disposed above the bottom ferromagnetic layer and having a remanent magnetization and thickness product $Mr_j\delta_j$, wherein a relationship $Mr\delta \approx \Sigma(Mr_i\delta_i - Mr_j\delta_j)$ is satisfied, where $Mr\delta$ denotes a total remanent magnetization and thickness product of the magnetic layer structure, such that magnetization directions of adjacent ferromagnetic layers in the magnetic layer structure are closely antiparallel, and (b) forming the underlayer and the magnetic structure by sequential (or continuous) sputtering.

Other objects and further features of the present invention will be apparent from the following detailed description when read in conjunction with the accompanying drawings.

DESCRIPTION OF THE PREFERRED EMBODIMENTS

Figure 1:
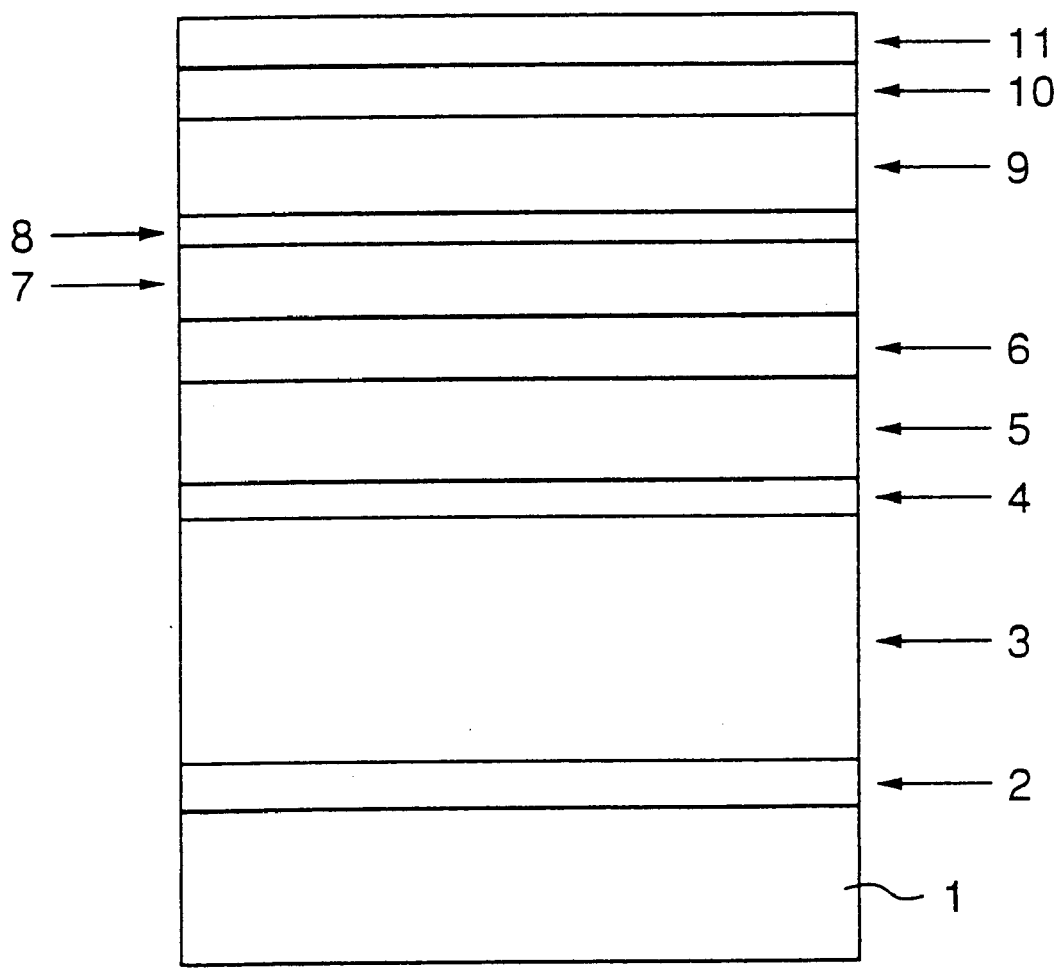
FIG. 1 is a cross sectional view showing an important part of a first embodiment of the magnetic recording medium according to the present invention.

A description will hereinafter be given of embodiments of the present invention, by referring to the drawings.

First, a description will be given of the operating principle of the present invention.

The present invention submits the use of layers with antiparallel magnetization structures. For example, S. S. P. Parkin, "Systematic Variation of the Strength and Oscillation Period of Indirect Magnetic Exchange Coupling through the 3d, 4d, and 5d Transition Metals", Phys. Rev. Lett. Vol.67, 3598 (1991) describes several magnetic transition metals such as Co, Fe and Ni that are coupled through thin non-magnetic interlayers such as Ru and Rh. On the other hand, a U.S. Pat. No. 5,701,223 proposes a spin-valve which employs the above described layers as laminated pinning layers to stabilize the sensor.

For a particular Ru or Ir layer thickness between two ferromagnetic layers, the magnetizations can be made parallel or antiparallel. For example, for a structure made up of two ferromagnetic layers of different thickness with antiparallel magnetizations, the effective grain size of a magnetic recording medium can be increased without significantly affecting the resolution. A signal amplitude reproduced from such a magnetic recording medium is reduced due to the opposite magnetizations, but this can be rectified by adding another layer of appropriate thickness and magnetization direction, under the laminated magnetic layer structure, to thereby cancel the effect of one of the layers. As a result, it is possible to increase the signal amplitude reproduced from the magnetic recording medium, and to also increase the effective grain volume. Thermally stable written bits can therefore be realized.

The present invention increases the thermal stability of written bits by exchange coupling the magnetic layer to another ferromagnetic layer with an opposite magnetization or, by a laminated ferrimagnetic structure. The ferromagnetic layer or the laminated ferrimagnetic structure is made up of exchange-decoupled grains as the magnetic layer. In other words, the present invention uses an exchange pinning ferromagnetic layer or a ferrimagnetic multilayer to improve the thermal stability performance of the magnetic recording medium.

FIG. 1 is a cross sectional view showing an important part of a first embodiment of a magnetic recording medium according to the present invention.

The magnetic recording medium includes a non-magnetic substrate 1, a first seed layer 2, a NiP layer 3, a second seed layer 4, an underlayer 5, a non-magnetic intermediate layer 6, a ferromagnetic layer 7, a non-magnetic coupling layer 8, a magnetic layer 9, a protection layer 10, and a lubricant layer 11 which are stacked in the order shown in FIG. 1.

For example, the non-magnetic substrate 1 is made of Al, Al alloy or glass. This non-magnetic substrate 1 may or may not be mechanically textured. The first seed layer 2 is made of Cr or Ti, for example, especially in the case where the non-magnetic substrate 1 is made of glass. The NiP layer 3 is preferably oxidized and may or may not be mechanically textured. The second seed layer 4 is provided to promote a (001) or a (112) texture of the underlayer 5 when using a B2 structure alloy such as NiAl and FeAl for the underlayer 5. The second seed layer 4 is made of an appropriate material similar to that of the first seed layer 2.

In a case where the magnetic recording medium is a magnetic disk, the mechanical texturing provided on the non-magnetic substrate 1 or the NiP layer 3 is made in a circumferential direction of the disk, that is, in a direction in which tracks of the disk extend.

The non-magnetic intermediate layer 6 is provided to further promote epitaxy, narrow the grain distribution of the magnetic layer 9, and orient the anisotropy axes of the magnetic layer 9 along a plane parallel to the recording surface of the magnetic recording medium. This non-magnetic intermediate layer 6 is made of a hcp structure alloy such as CoCr-M, where M=B, Mo, Nb, Ta, W or alloys thereof, and has a thickness in a range of 1 to 5 nm.

The ferromagnetic layer 7 is made of Co, Ni, Fe, Co-based alloy, Ni-based alloy, Fe-based alloy or the like. In other words, alloys such as CoCrTa, CoCrPt and CoCrPt-M, where M=B, Mo, Nb, Ta, W, Cu or alloys thereof may be used for the ferromagnetic layer 7. This ferromagnetic layer 7 has a thickness in a range of 2 to 10 nm. The non-coupling magnetic layer 8 is made of Ru, Ir, Rh, Ru-based alloy, Ir-based alloy, Rh-based alloy or the like. This non-magnetic coupling layer 8 preferably has a thickness in a range of 0.4 to 1.0 nm, and preferably on the order of approximately 0.6 to 0.8 nm. For this particular thickness range of the non-magnetic coupling layer 8, the magnetizations of the ferromagnetic layer 7 and the magnetic layer 9 are antiparallel. The ferromagnetic layer 7 and the non-magnetic coupling layer 8 form an exchange layer structure.

For a ferromagnetic layer 7 made of a Fe-based alloy, Cr forms a better non-magnetic coupling layer 8. In this case, the Cr non-magnetic coupling layer 8 has an optimum thickness of approximately 1.8 nm.

The magnetic layer 9 is made of Co or a Co-based alloys such as CoCrTa, CoCrPt and CoCrPt-M, where M=B, Mo, Nb, Ta, W, Cu or alloys thereof. The magnetic layer 9 has a thickness in a range of 5 to 30 nm. Of course, the magnetic layer 9 is not limited to a single-layer structure, and a multilayer structure may be used for the magnetic layer 9.

The protection layer 10 is made of C, for example. In addition, the lubricant layer 11 is made of an organic lubricant, for example, for use with a magnetic transducer such as a spin-valve head. The protection layer 10 and the lubricant layer 11 form a protection layer structure on the recording surface of the magnetic recording medium.

Obviously, the layer structure under the exchange layer structure is not limited to that shown in FIG. 1. For example, the underlayer 5 may be made of Cr or Cr-based alloy and formed to a thickness in a range of 5 to 40 nm on the substrate 1, and the exchange layer structure may be provided on this underlayer 5.

Next, a description will be given of a second embodiment of the magnetic recording medium according to the present invention.

Figure 2:
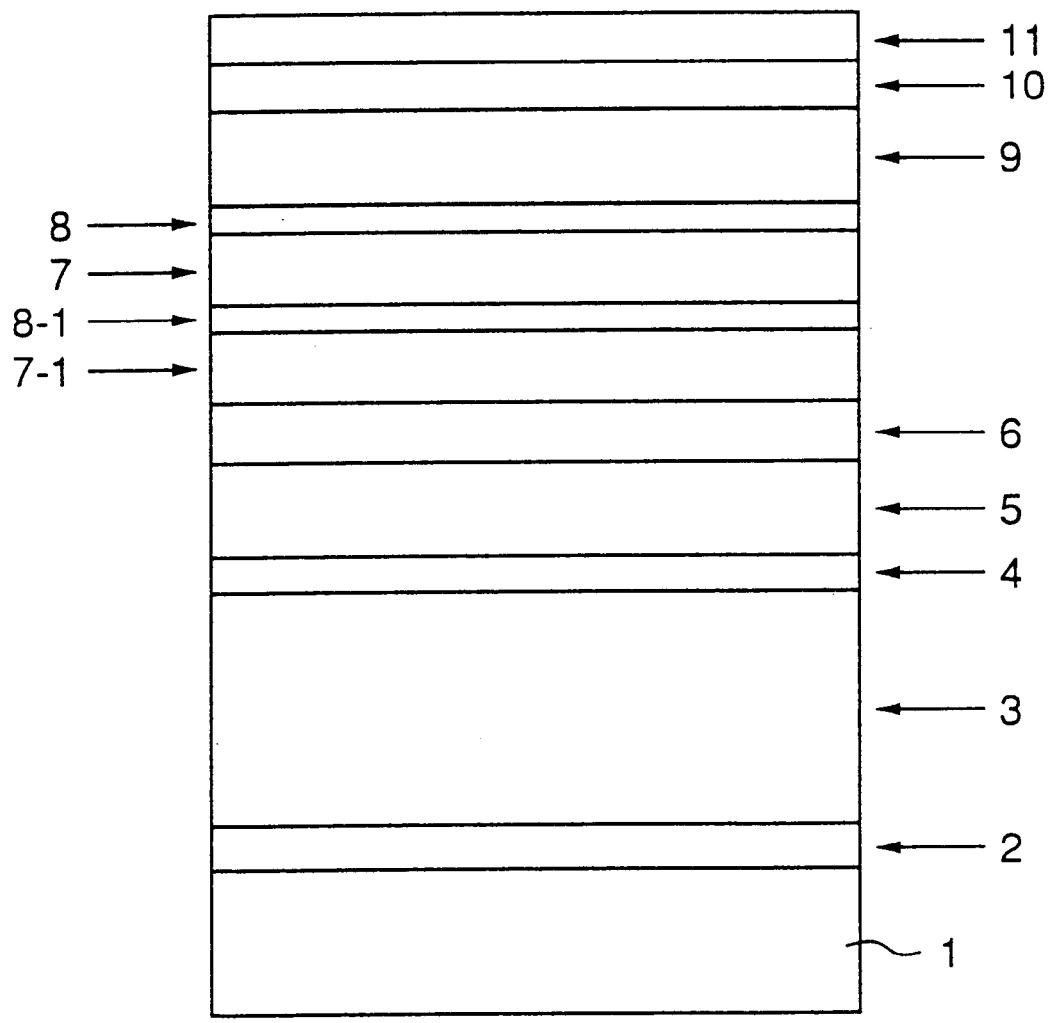
FIG. 2 is a cross sectional view showing an important part of a second embodiment of the magnetic recording medium according to the present invention.

FIG. 2 is a cross sectional view showing an important part of the second embodiment of the magnetic recording medium. In FIG. 2, those parts which are the same as those corresponding parts in FIG. 1 are designated by the same reference numerals, and a description thereof will be omitted.

In this second embodiment of the magnetic recording medium, the exchange layer structure includes two non-magnetic coupling layers 8 and 8-1, and two ferromagnetic layers 7 and 7-1, which form a ferrimagnetic multilayer. This arrangement increases the effective magnetization and signal, since the magnetizations of the two non-magnetic coupling layers 8 and 8-1 cancel each other instead of a portion of the magnetic layer 9. As a result, the grain volume and thermal stability of magnetization of the magnetic layer 9 are effectively increased. More bilayer structures made up of the pair of ferromagnetic layer and non-magnetic coupling layer may be provided additionally to increase the effective grain volume, as long as the easy axis of magnetization are appropriately oriented for the subsequently provided layers.

The ferromagnetic layer 7-1 is made of a material similar to that of ferromagnetic layer 7, and has a thickness range selected similarly to the ferromagnetic layer 7. In addition, the non-magnetic coupling layer 8-1 is made of a material similar to that of the non-magnetic coupling layer 8, and has a thickness range selected similarly to the non-magnetic coupling layer 8. Within the ferromagnetic layers 7-1 and 7, the c-axes are preferably in-plane and the grain growth columnar.

In this embodiment, the magnetic anisotropy of the ferromagnetic layer 7-1 is preferably higher than that of the ferromagnetic layer 7. However, the magnetic anisotropy of the ferromagnetic layer 7-1 may be the same as or, be higher than that of, the magnetic layer 9.

Furthermore, a remanent magnetization and thickness product of the ferromagnetic layer 7 may be smaller than that of the ferromagnetic layer 7-1.

Figure 3:
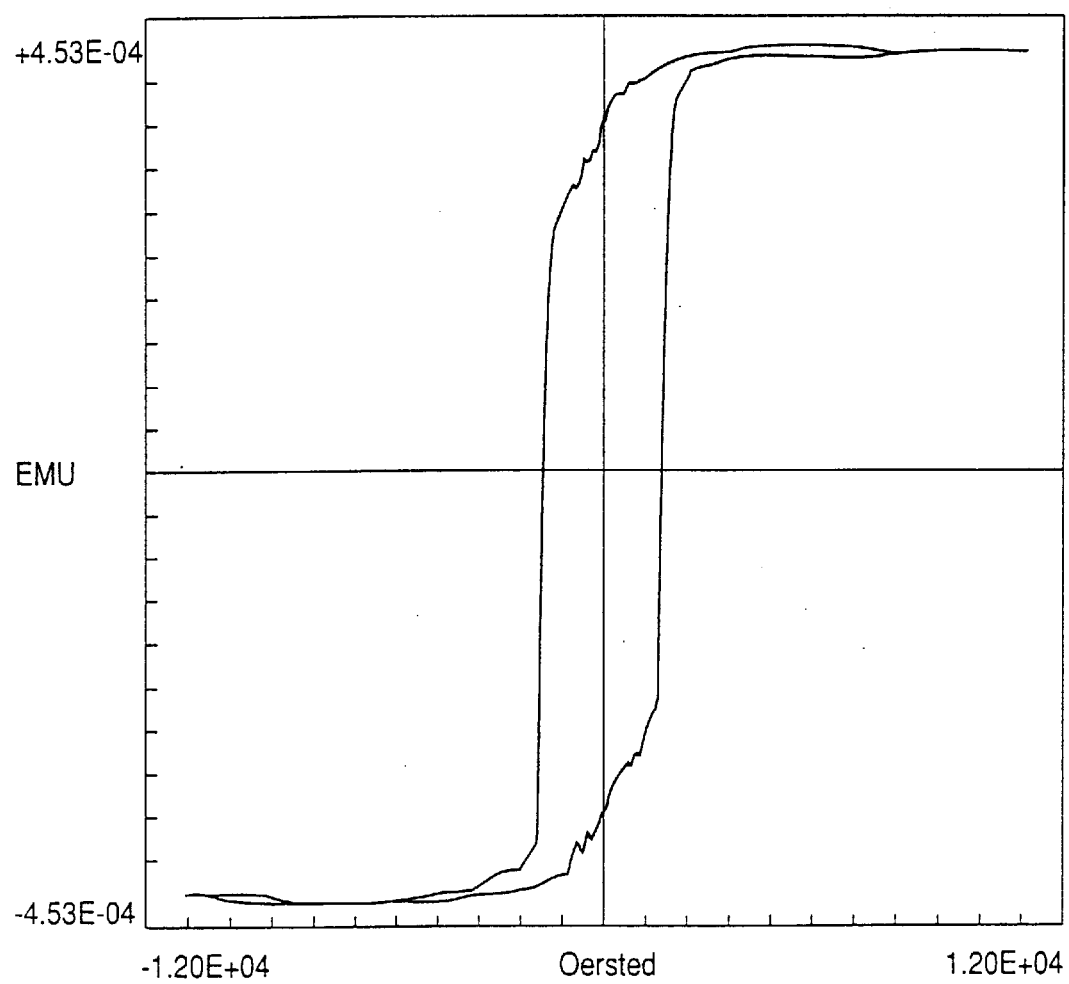
FIG. 3 is a diagram showing an in-plane magnetization curve of a single CoPt layer having a thickness of 10 nm on a Si substrate.

FIG. 3 is a diagram showing an in-plane magnetization curve of a single CoPt layer having a thickness of 10 nm on a Si substrate. In FIG. 3, the ordinate indicates the magnetization (emu), and the abscissa indicates the magnetic field (Oe). Conventional magnetic recording media show a behavior similar to that shown in FIG. 3.

Figure 4:
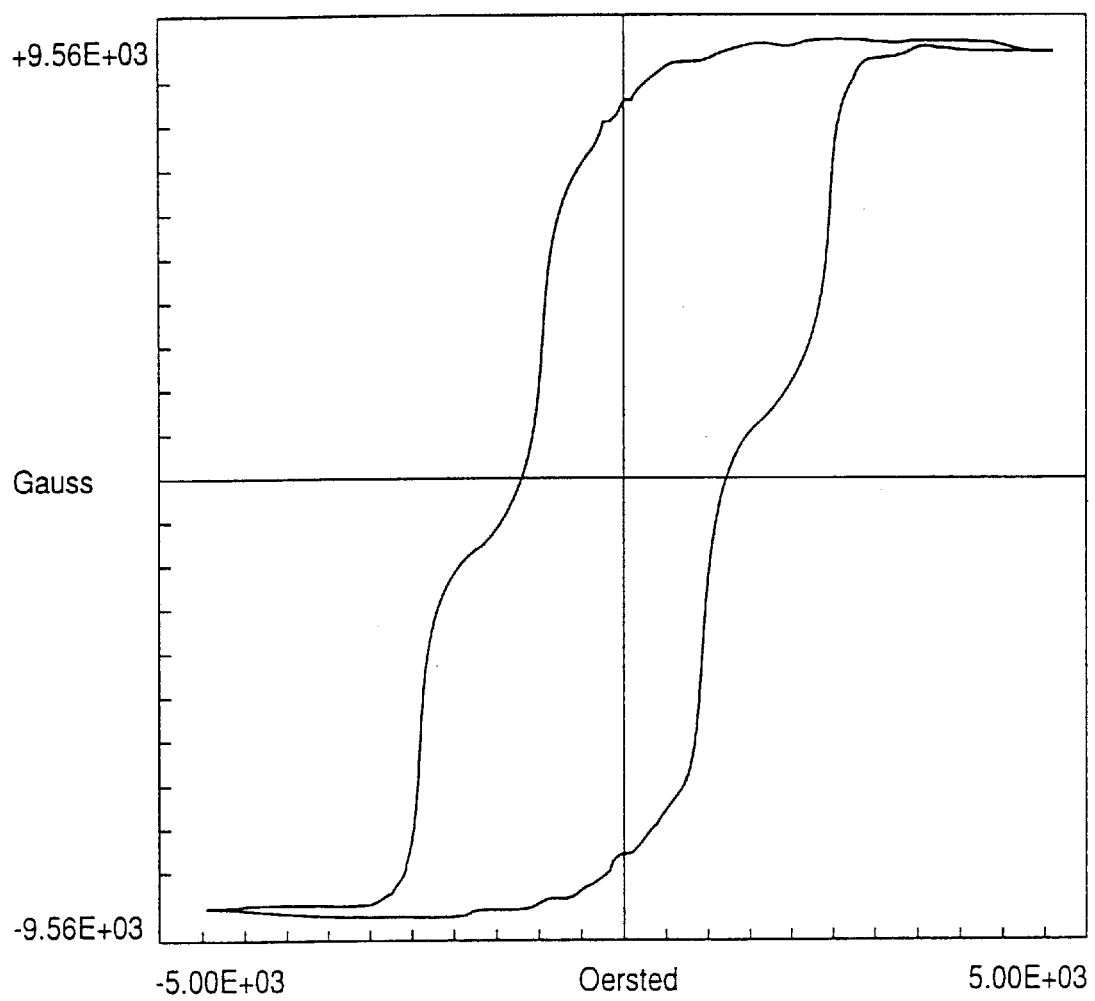
FIG. 4 is a diagram showing an in-plane magnetization curve of two CoPt layers separated by a Ru layer having a thickness of 0.8 nm.

FIG. 4 is a diagram showing an in-plane magnetization curve of two CoPt layers separated by a Ru layer having a thickness of 0.8 nm, as in the case of the first embodiment of the magnetic recording medium. In FIG. 4, the ordinate indicates the magnetization (Gauss), and the abscissa indicates the magnetic field (Oe). As may be seen from FIG. 4, the loop shows shifts near the magnetic field which indicate the antiparallel coupling.

Figure 5:
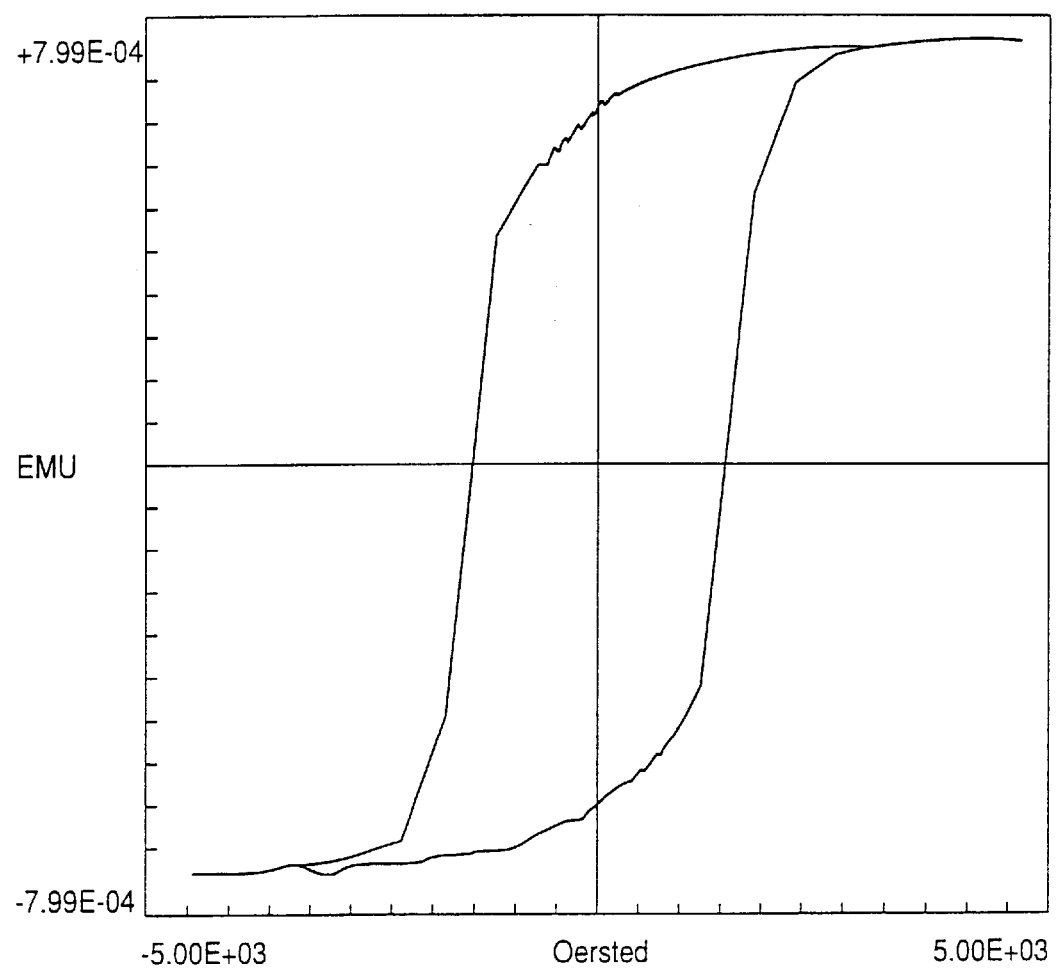
FIG. 5 is a diagram showing an in-plane magnetization curve of two CoPt layers separated by a Ru layer having a thickness of 1.4 nm.

FIG. 5 is a diagram showing an in-plane magnetization curve of two CoPt layers separated by a Ru layer having a thickness of 1.4 nm. In FIG. 5, the ordinate indicates the magnetization (emu), and the abscissa indicates the magnetic field (Oe). As may be seen from FIG. 5, the magnetizations of the two CoPt layers are parallel.

Figure 6:
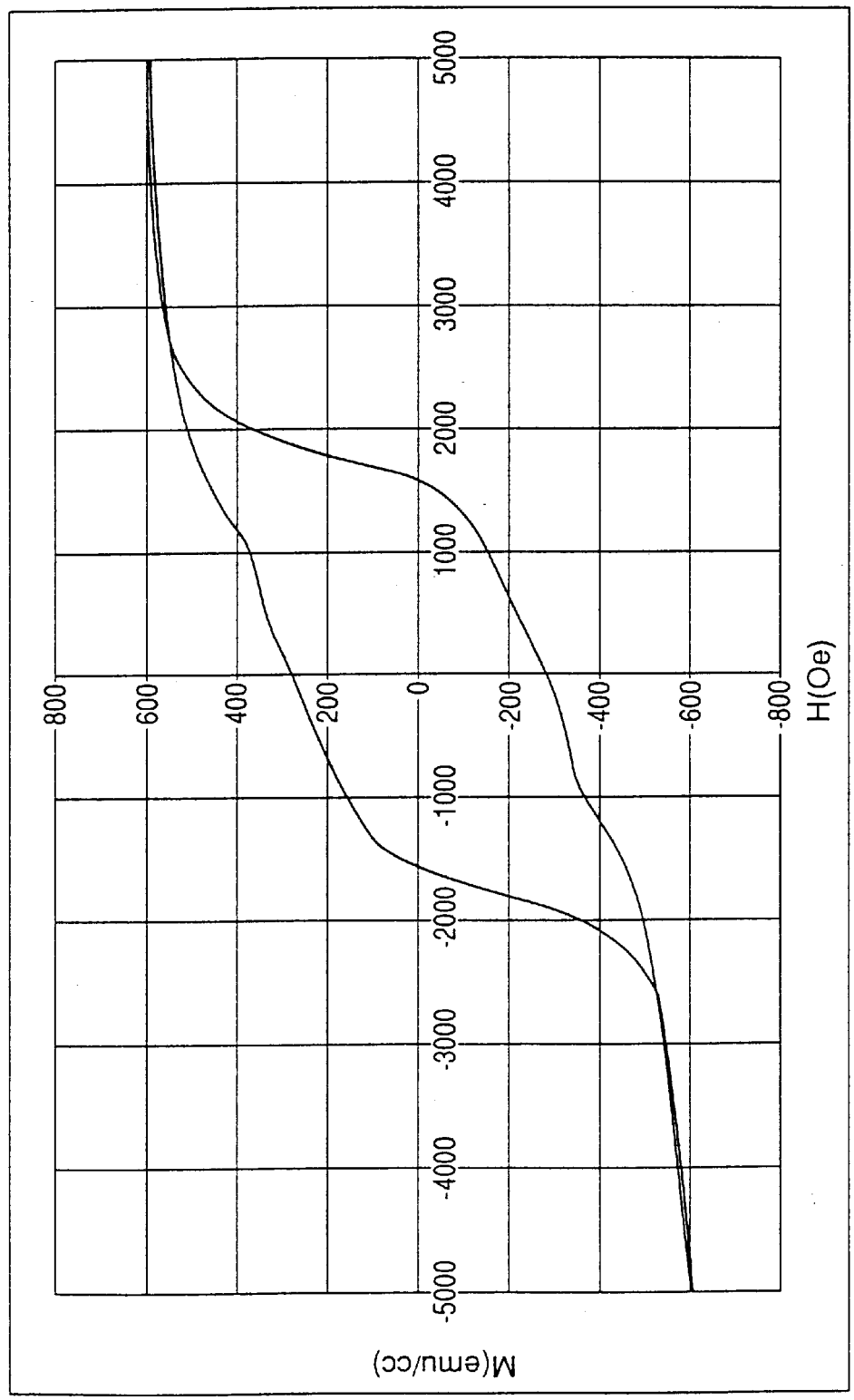
FIG. 6 is a diagram showing an in-plane magnetization curve two CoCrPt layers separated by a Ru having a thickness of 0.8 nm.

FIG. 6 is a diagram showing an in-plane magnetization curve for two CoCrPt layers separated by a Ru having a thickness of 0.8 nm, as in the case of the second embodiment of the magnetic recording medium. In FIG. 6, the ordinate indicates the magnetization (emu/cc), and the abscissa indicates the field (Oe). As may be seen from FIG. 6, the loop shows shifts near the field which indicate the antiparallel coupling.

From FIGS. 3 and 4, it may be seen that the antiparallel coupling can be obtained by the provision of the exchange layer structure. In addition, it may be seen by comparing FIG. 5 with FIGS. 4 and 6, the non-magnetic coupling layer 8 is desirably in the range of 0.4 to 0.9 nm in order to achieve the antiparallel coupling.

Therefore, according to the first and second embodiments of the magnetic recording medium, it is possible to effectively increase the apparent grain volume of the magnetic layer by the exchange coupling provided between the magnetic layer and the ferromagnetic layer via the non-magnetic coupling layer, without sacrificing the resolution. In other words, the apparent thickness of the magnetic layer is increased with regard to the grain volume of the magnetic layer so that a thermally stable medium can be obtained, and in addition, the effective thickness of the magnetic layer is maintained since cancellation of signals especially from the bottom layers is achieved. This allows higher linear density recording that is otherwise not possible for thick media. As a result, it is possible to obtain a magnetic recording medium with reduced medium noise and thermally stable performance.

Figure 7:
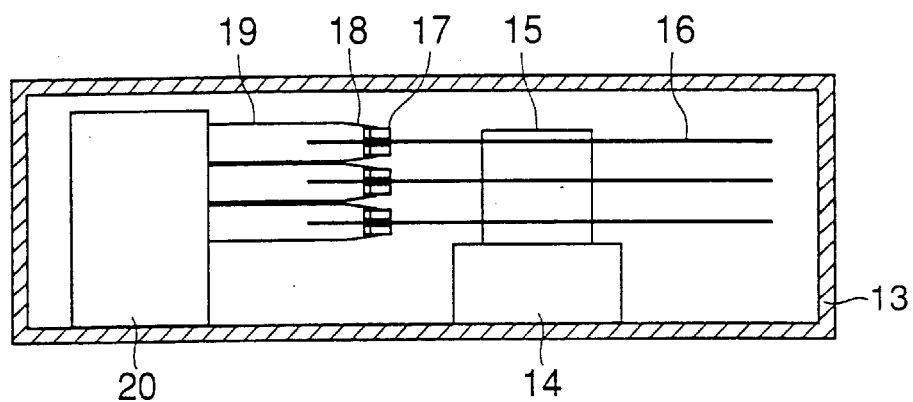
FIG. 7 is a cross sectional view showing an important part of an embodiment of the magnetic storage apparatus according to the present invention.

Next, a description will be given of an embodiment of a magnetic storage apparatus according to the present invention, by referring to FIGS. 7 and 8. FIG. 7 is a cross sectional view showing an important part of this embodiment of the magnetic storage apparatus, and FIG. 8 is a plan view showing the important part of this embodiment of the magnetic storage apparatus.

Figure 8:
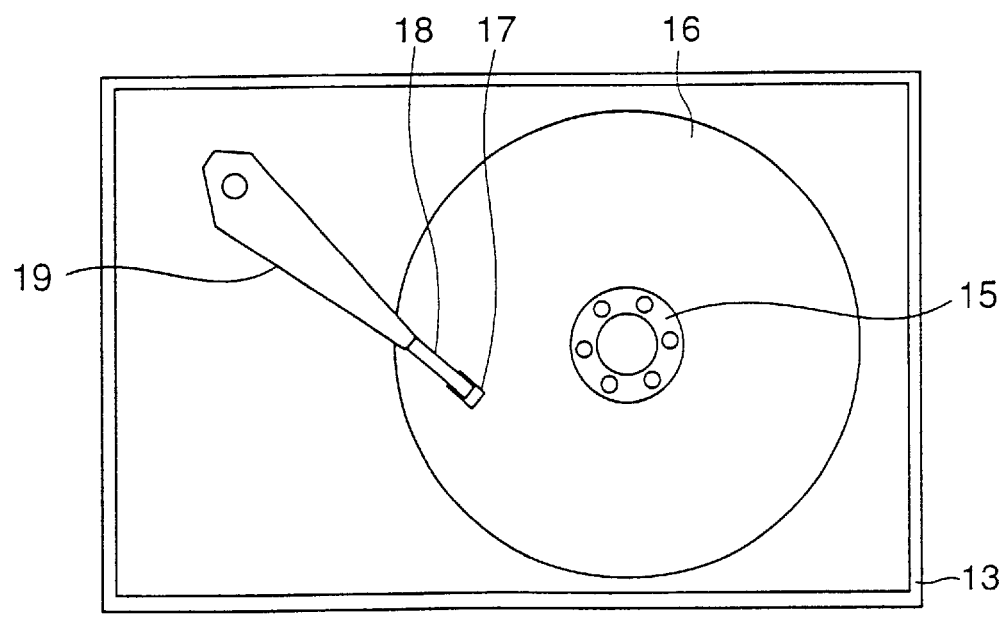
FIG. 8 is a plan view showing the important part of the embodiment of the magnetic storage apparatus.

As shown in FIGS. 7 and 8, the magnetic storage apparatus generally includes a housing 13. A motor 14, a hub 15, a plurality of magnetic recording media 16, a plurality of recording and reproducing heads 17, a plurality of suspensions 18, a plurality of arms 19, and an actuator unit 20 are provided within the housing 13. The magnetic recording media 16 are mounted on the hub 15 which is rotated by the motor 14. The recording and reproducing head 17 is made up of a reproducing head such as a MR or GMR head, and a recording head such as an inductive head. Each recording and reproducing head 17 is mounted on the tip end of a corresponding arm 19 via the suspension 18. The arms 19 are moved by the actuator unit 20. The basic construction of this magnetic storage apparatus is known, and a detailed description thereof will be omitted in this specification.

This embodiment of the magnetic storage apparatus is characterized by the magnetic recording media 16. Each magnetic recording medium 16 has the structure of the first or second embodiment of the magnetic recording medium described above in conjunction with FIGS. 1 and 2. Of course, the number of magnetic recording media 16 is not limited to three, and only one, two or four or more magnetic recording media 16 may be provided.

The basic construction of the magnetic storage unit is not limited to that shown in FIGS. 7 and 8. In addition, the magnetic recording medium used in the present invention is not limited to a magnetic disk.

Next, a description will be given of further features of the present invention, in comparison with the conventional magnetic recording medium having no exchange layer structure. In the following description, the ferromagnetic layer of the exchange layer structure and the magnetic layer will also be referred to as ferromagnetic layers forming a magnetic layer structure.

Figure 9:
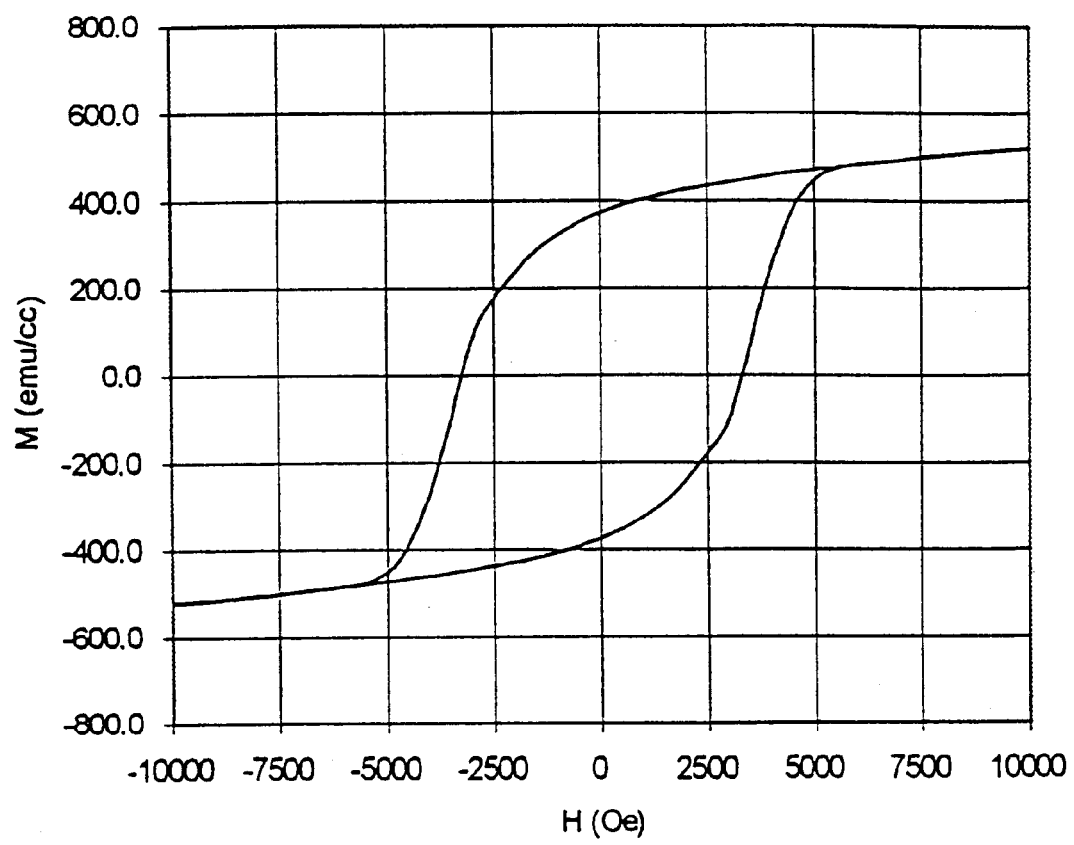
FIG. 9 is a diagram showing an in-plane magnetization curve for a magnetic recording medium having a single CoCrPtB layer grown on a NiAl layer on glass.

FIG. 9 is a diagram showing an in-plane magnetization curve for a magnetic recording medium having a single layer of CoCrPtB grown on a NiAl layer on glass. In FIG. 9, the ordinate indicates the magnetization M (emu/cc), and the abscissa indicates the magnetic field H (Oe). Similar M-H curves are observed for a single Co-based layer grown on a Cr underlayer on NiP coated Al substrate or NiP coated glass substrate.

Figure 10:
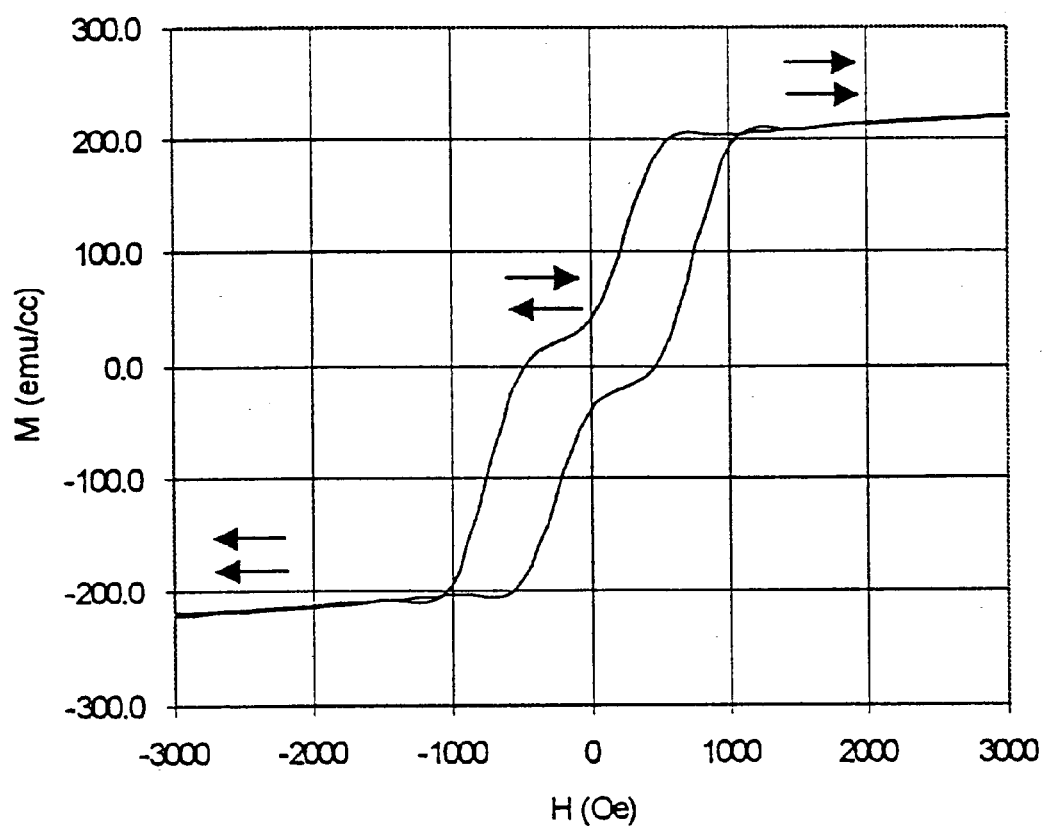
FIG. 10 is a diagram showing an in-plane magnetization curve for a magnetic recording medium having two ferromagnetic layers of CoCrPtB separated by a Ru layer having a thickness of 0.8 nm on a NiP coated Al-Mg substrate.

On the other hand, FIG. 10 is a diagram showing an in-plane magnetization curve for a magnetic recording medium having two ferromagnetic layers of CoCrPtB separated by a Ru layer having a thickness of 0.8 nm, sputtered on a NiP coated Al-Mg substrate. In FIG. 10, the ordinate indicates the magnetization M (emu/cc), and the abscissa indicates the magnetic field H (Oe). As may be seen from FIG. 10, the magnetization M abruptly decreases when the magnetic field H is around H=500 Oe which indicates an exchange coupling field of approximately 1000 Oe. The reduced magnetization M at H=0 evidences the anti-parallel coupling.

The optimum Ru thickness for the negative coupling can be determined not only by magnetometry but also by spin stand methods. The reproduced signal at low densities gives an indication of a remanent magnetization and thickness product Mrδ, where Mr denotes the remanent magnetization and δ denotes the effective thickness of the CoCrPtB layer, that is, the ferromagnetic layer of the magnetic layer structure. If the Ru thickness is varied while the thicknesses of the two CoCrPtB layers are maintained constant, the reproduced signal shows a dip at the optimum Ru thickness. The optimum Ru thickness may depend on the magnetic materials and the processing used to form the ferromagnetic layers of the magnetic layer structure. For CoCrPt-based alloys manufactured above 150° C., the antiparallel coupling is induced for the Ru thickness in a range of approximately 0.4 to 1.0 nm.

Figure 11:
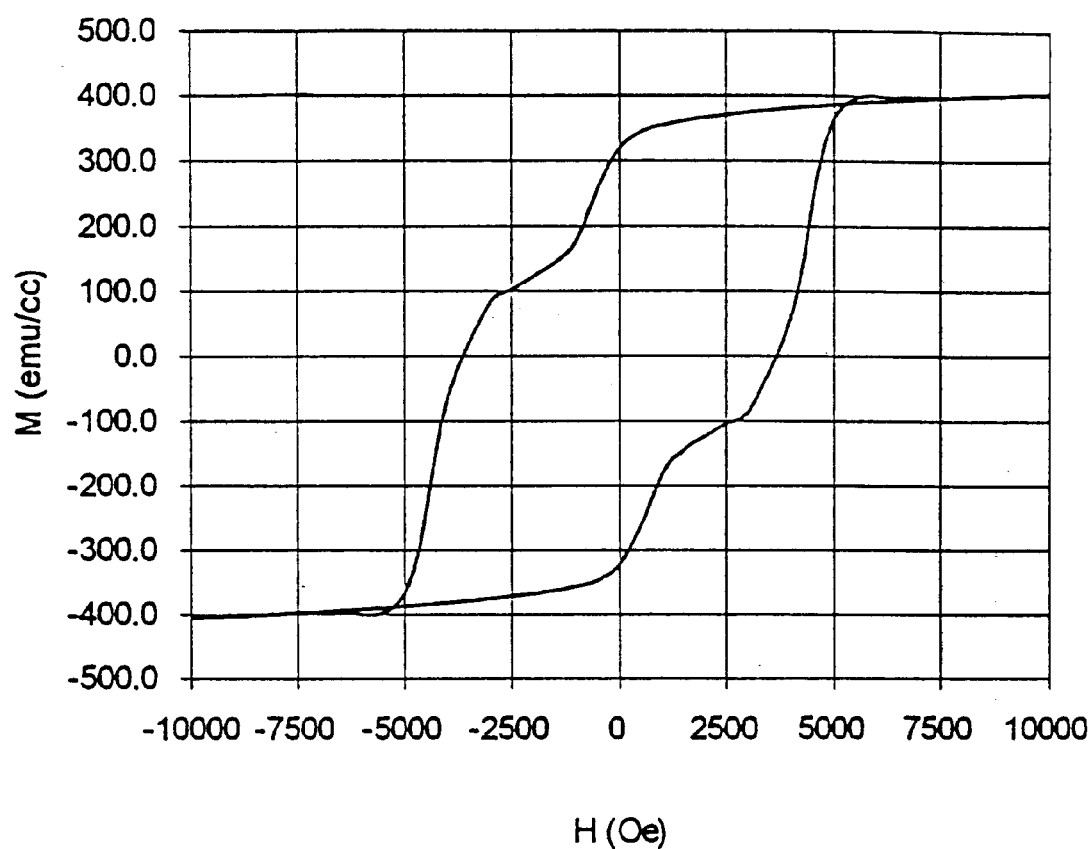
FIG. 11 is a diagram showing an in-plane magnetization curve for a magnetic recording medium having two ferromagnetic layers of CoCrPtB separated by a Ru layer on a NiP coated Al substrate.

FIG. 11 is a diagram showing an in-plane magnetization curve for a magnetic recording medium having two ferromagnetic layers of CoCrPtB separated by a Ru layer, on a NiP coated Al substrate. In FIG. 11, the ordinate indicates the magnetization M (emu/cc), and the abscissa indicates the magnetic field H (Oe). FIG. 11 shows a case where a first CoCrPtB layer closer to the substrate is 8 nm thick, the Ru layer is 0.8 nm thick, and a second CoCrPtB layer further away from the substrate is 20 nm thick.

In this case, antiparallel coupling is observed but at higher negative magnetic fields. Unless the demagnetizing fields inside bits are very high, the antiparallel coupling is not completely achieved and very high reproduced signals are observed as the magnetizations in both the first and second CoCrPtB layers point in essentially the same direction. It is therefore necessary to reduce the coercivity Hc of the first CoCrPtB layer by reducing the thickness thereof or, by use of compositions which result in a lower coercivity Hc. For CoCrPt-based materials, the latter is usually achieved by increasing the Cr content and/or reducing the Pt content.

Figure 12:
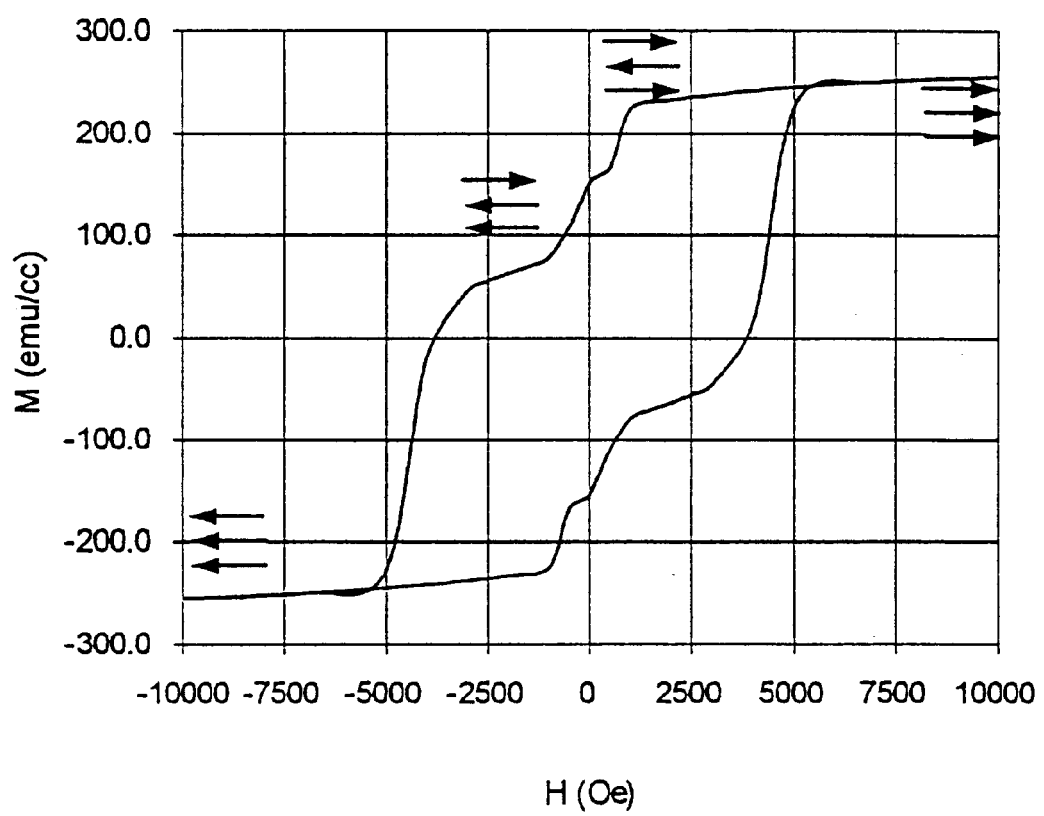
FIG. 12 is a diagram showing an in-plane magnetization curve for a magnetic recording medium having three ferromagnetic layers of CoCrPtB separated by a Ru layer between each two adjacent CoCrPtB layers on a NiP coated Al substrate.

FIG. 12 is a diagram showing an in-plane magnetization curve for a magnetic recording medium having three ferromagnetic layers of CoCrPtB separated by a Ru layer between each two adjacent CoCrPtB layers, on a NiP coated Al substrate. In FIG. 12, the ordinate indicates the magnetization M (emu/cc), and the abscissa indicates the magnetic field H (Oe). FIG. 12 shows a case where first and second CoCrPtB layers closer to the substrate are 6 nm thick, a top third CoCrPtB layer is 20 nm thick, and the Ru layers between the first and second CoCrPtB layers and between the second and third CoCrPtB layers respectively are 0.8 nm thick. In this case, the magnetization M drops when the magnetic field H is H=500 Oe, which indicates that one of the first through third CoCrPtB layers reversed magnetization at positive fields. It is likely the middle second CoCrPtB layer which reversed magnetization since this middle second CoCrPtB layer is subject to a stronger reversing field due to the two interfaces. The interlayer interaction is therefore 500 Oe greater than the coercivity Hc of the middle second CoCrPtB layer.

However, at low negative magnetic fields, the bottom first CoCrPtB layer starts reversing magnetization, such that at approximately −1000 Oe, the magnetization of only the top third CoCrPtB layer is not reversed. Preferably, the bottom first CoCrPtB layer should not reverse magnetization at magnetic fields which are low compared to the demagnetizing fields inside bits, and this may be achieved for example by choosing the proper thickness and/or composition for the bottom first CoCrPtB layer. The magnetic recording medium which has these three ferromagnetic layers tend to have read-write performance which is better than the magnetic recording medium which only has a single ferromagnetic (magnetic) layer with no exchange coupling. There is a possibility that the reproduced signal will be reduced with time as more grains change layer magnetization configuration from parallel to antiparallel which is more stable. However, a solitary wave media signal-to-noise ratio (SNR) Siso/Nm of the magnetic recording medium is expected to be maintained since the medium noise level is also correspondingly reduced. Hence, the bit error rate (BER) which is intimately related to the isolated wave medium SNR Siso/Nm will not be degraded.

Figure 13:
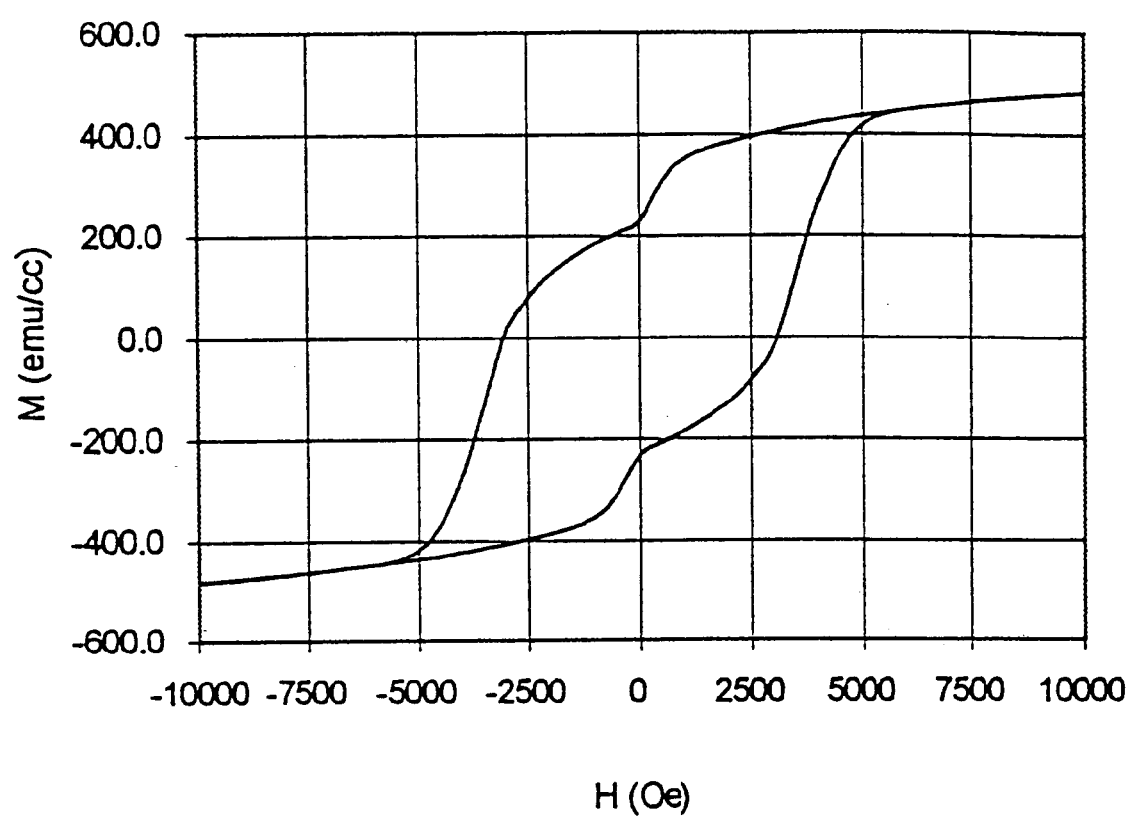
FIG. 13 is a diagram showing an in-plane magnetization curve for a magnetic recording medium having two negatively coupled ferromagnetic layers of CoCrPtB separated by a Ru layer, on a NiAl coated glass substrate.

FIG. 13 is a diagram showing an in-plane magnetization curve for a magnetic recording medium having two negatively coupled ferromagnetic layers of CoCrPtB separated by a Ru layer, on a NiAl coated glass substrate. In FIG. 13, the ordinate indicates the magnetization M (emu/cc), and the abscissa indicates the magnetic field H (Oe). As shown in FIG. 13, the bottom CoCrPtB layer closer to the substrate reverses magnetization even before the magnetic field H becomes H=0 Oe.

Figure 14:
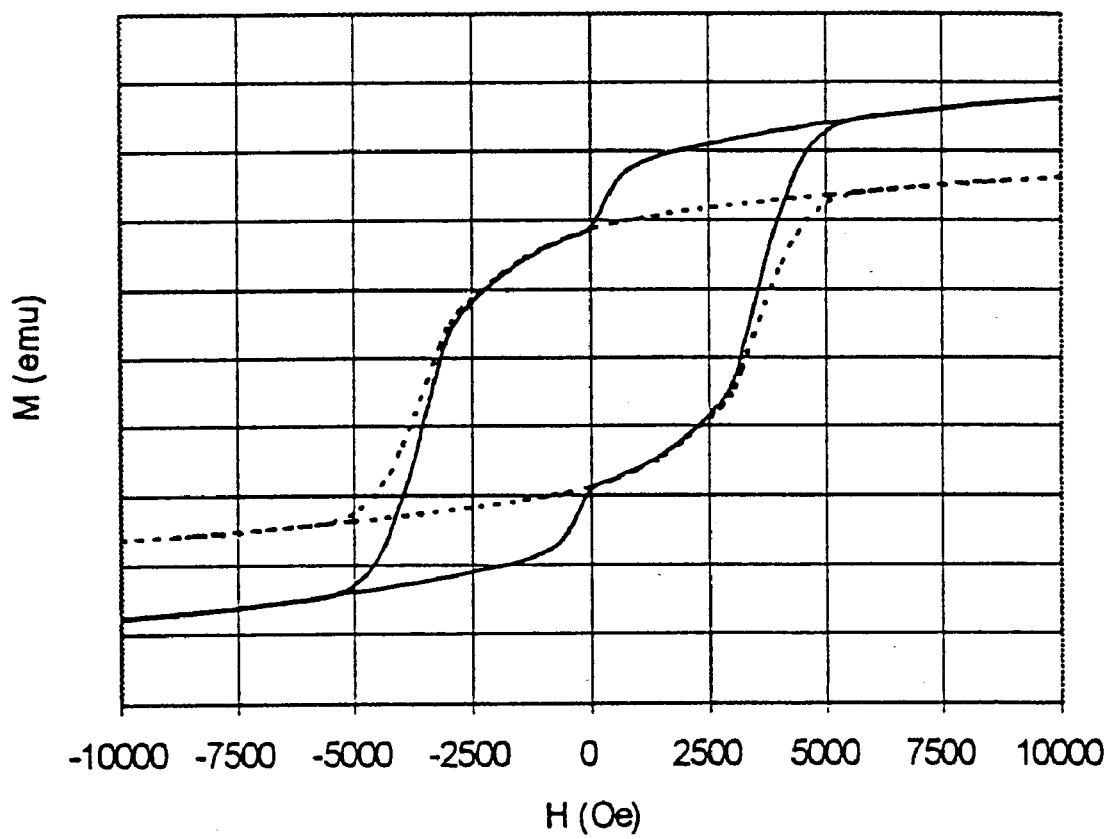
FIG. 14 is a diagram showing an in-plane magnetization curve shown in FIG. 13 in comparison with a magnetic recording medium having a single ferromagnetic layer of CoCrPtB on a NiAl coated glass substrate.

FIG. 14 is a diagram showing an in-plane magnetization curve shown in FIG. 13 in comparison with a magnetic recording medium having a single ferromagnetic layer of CoCrPtB on a NiAl coated glass substrate fabricated similarly to the recording medium having the two negatively coupled ferromagnetic layers. In FIG. 14, the ordinate indicates the magnetization M (emu/cc), and the abscissa indicates the magnetic field H (Oe). In FIG. 14, the in-plane magnetization curve shown in FIG. 13 is indicated by a solid line, and an in-plane magnetization curve for the recording medium with the single ferromagnetic layer is indicated by a dashed line. In FIG. 14, the saturation magnetization is normalized so as to illustrate the similarity of the M-H curve portions relevant to the magnetic recording.

When a head saturates a portion of the magnetic recording medium having the two negatively coupled ferromagnetic layers, the magnetization of both the two ferromagnetic layers is in the head field direction, but as soon as the head field is no longer applied, the bottom ferromagnetic layer reverses magnetization and the situation inside a bit would be similar to that of the magnetic recording medium having the single ferromagnetic layer. A read head only senses the resultant magnetization. A person skilled in the art can therefore tune the thickness, composition and processing of the ferromagnetic layers, so that the magnetic recording medium behaves similarly to the conventional magnetic recording medium but with an enhanced thermal stability.

Figure 15:
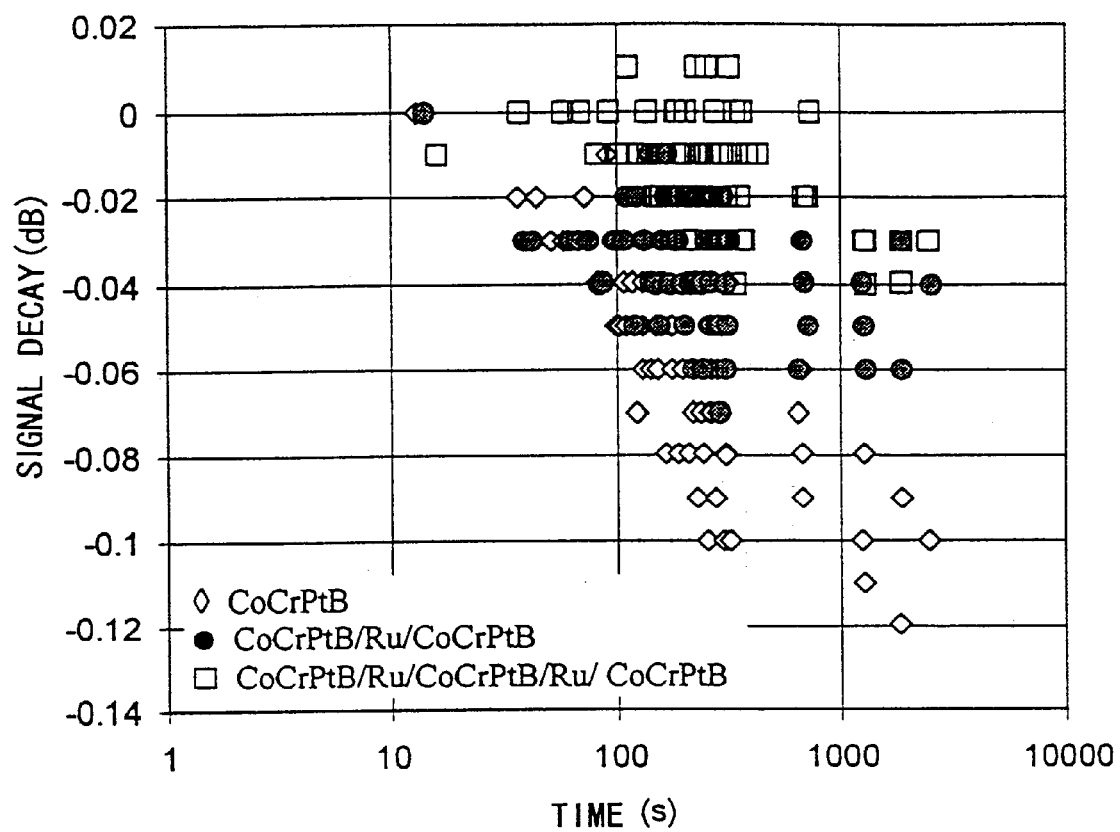
FIG. 15 is a diagram showing signal decays of the magnetic recording media having two and three ferromagnetic layers, in comparison with a signal decay of the magnetic recording medium having the single ferromagnetic layer.

FIG. 15 is a diagram showing signal decays of the magnetic recording media having two and three ferromagnetic layers, in comparison with a signal decay of the magnetic recording medium having the single ferromagnetic layer. In FIG. 15, the ordinate indicates the signal decay (dB) of the reproduced signal for 207 kfci bits, and the abscissa indicates the time (s). In FIG. 15, ◊ indicates the data of the magnetic recording medium having the single CoCrPtB layer which is 10 nm thick, ● indicates the data of the magnetic recording medium having the bottom first CoCrPtB layer which is 10 nm thick, the Ru layer which is 0.8 nm thick and the top second CoCrPtB layer which is 4 nm thick, and ☐ indicates the data of the magnetic recording medium having the bottom first CoCrPtB layer which is 10 nm thick, the first Ru layer which is 0.8 nm thick, the middle CoCrPtB layer which is 4 nm thick, the second Ru layer which is 0.8 nm thick and the top third CoCrPtB layer which is 4 nm thick. The ferromagnetic layer compositions are all the same, and the coercivity Hc measured with a Kerr magnetometer are approximately 2700 Oe (214.8 kA/m) and are similar. As may be seen from FIG. 15, the magnetic recording media having two ferromagnetic layers and three ferromagnetic layers show more thermally stable characteristics as the effective volume is increased, as compared to the magnetic recording medium having the single ferromagnetic layer and no exchange coupling.

Figure 16:
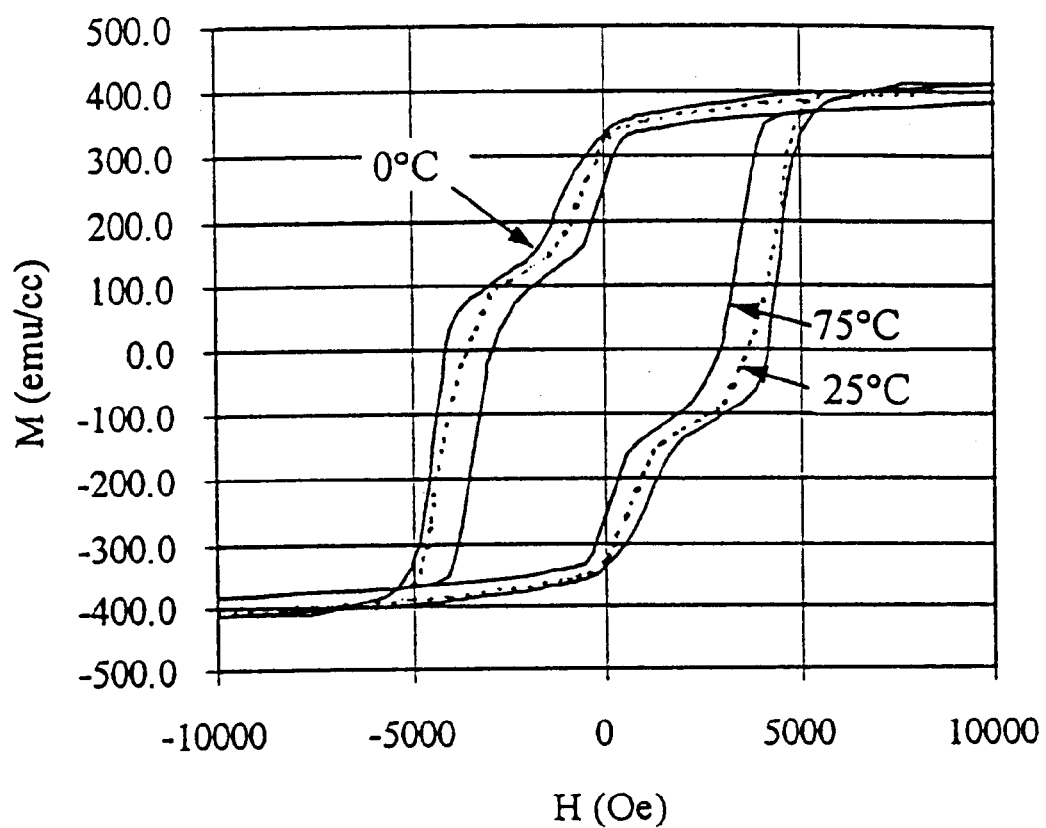
FIG. 16 is a diagram showing M-H curves of the magnetic recording medium having the two negatively coupled ferromagnetic layers at different temperatures.

FIG. 16 is a diagram showing M-H curves of the magnetic recording medium having the two negatively coupled ferromagnetic layers at different temperatures. In FIG. 16, the ordinate indicates the magnetization M (emu/cc), the abscissa indicates the magnetic field H (Oe), and the data are shown for three different temperatures which are 0° C., 25° C. and 75° C. A strong negative coupling is observed over a wide temperature range, and covers the range useful for magnetic recording media such as disks and tapes.

Figure 17:
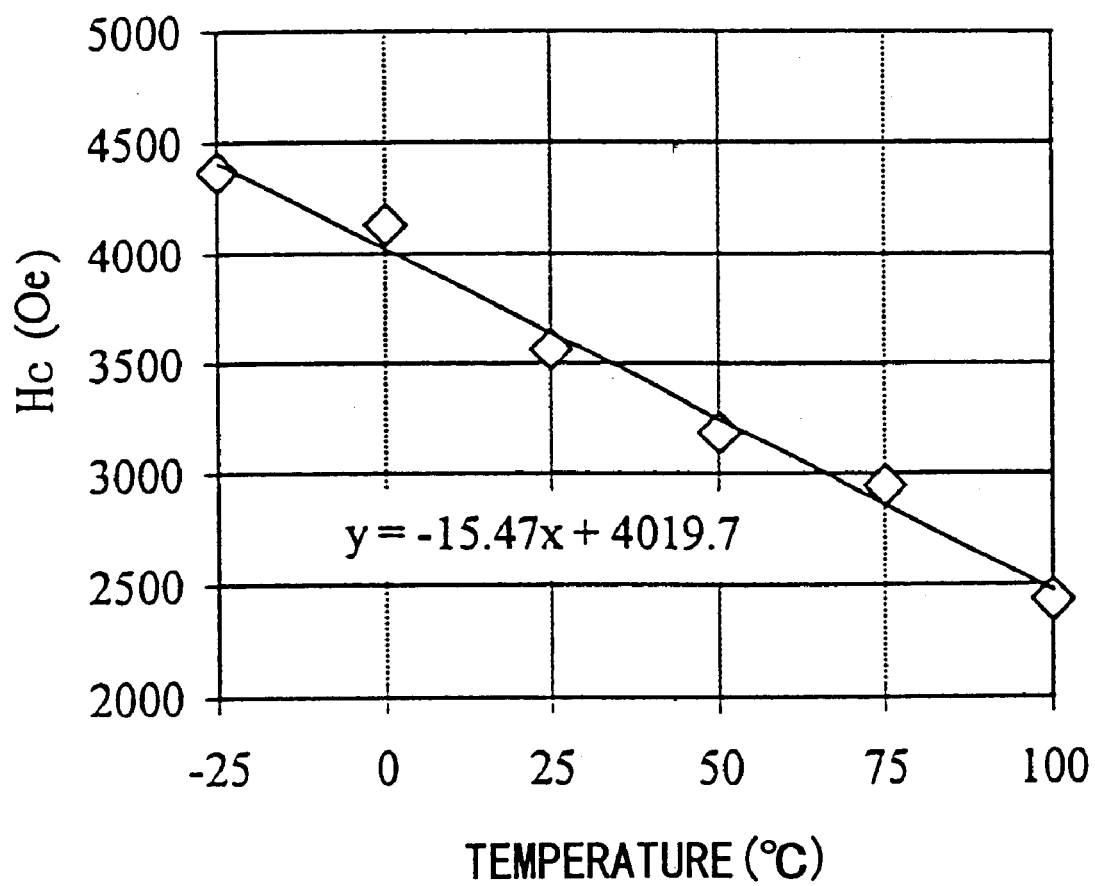
FIG. 17 is a diagram showing the temperature dependence of the coercivity for the magnetic recording medium having the characteristics shown in FIG. 16.

FIG. 17 is a diagram showing the temperature dependence of the coercivity for the magnetic recording medium having the characteristics shown in FIG. 16. In FIG. 17, the ordinate indicates the coercivity Hc (Oe), and the abscissa indicates the measured temperature (° C.). In addition, y=Hc and x=temperature in the expression y=−15.47 x+4019.7. The coercivity change with temperature dHc/dT=15.5 Oe/° C. and is less than that of the magnetic recording medium having the single ferromagnetic layer. A typical dHc/dT for the magnetic recording medium having the single ferromagnetic layer is 16 to 17 Oe/° C. Accordingly, it may be clearly seen that the improved dHc/dT value obtained for the magnetic recording medium having the two negatively coupled ferromagnetic layers primarily arises from the increased effective volume.

Figure 18:
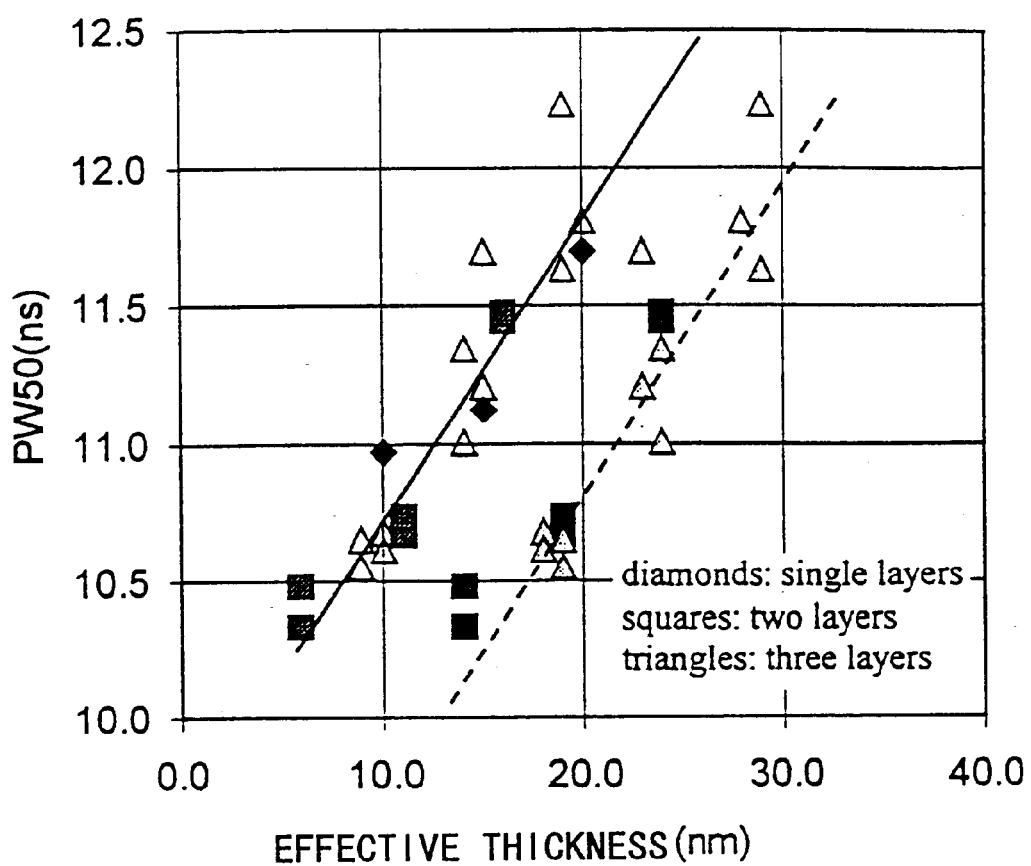
FIG. 18 is a diagram showing the PW50 dependence on the effective and total ferromagnetic layer thickness of the magnetic recording media having one, two and three ferromagnetic layers.

FIG. 18 is a diagram showing the PW50 dependence on the effective and total ferromagnetic layer thickness of the magnetic recording media having two and three ferromagnetic layers, in comparison with the PW50 dependence on the effective and total ferromagnetic layer thickness of the magnetic recording medium having the single ferromagnetic layer. In FIG. 18, the ordinate indicates the PW50 (ns), and the abscissa indicates the effective and total ferromagnetic layer thickness (nm). In FIG. 18, ♦ indicates the data of the magnetic recording medium having the single ferromagnetic layer, ■ indicates the data of the magnetic recording medium having two exchange-coupled ferromagnetic layers, and Δ indicates the data of the magnetic recording medium having three exchange-coupled ferromagnetic layers. The thickness and composition of the ferromagnetic layers are basically the same as those used to obtain the data shown in FIG. 15. For the data on the left side along the solid line, the thickness used is the effective thickness, that is, magnetization cancellation due to an antiparallel configuration is assumed. Significant correlation is observed validating the assumption. When the total thickness of the ferromagnetic layer or layers is used, the data shifts to the right along the dotted line, which give unreasonably small PW50 values for the thicknesses involved when compared to those of the magnetic recording medium having the single ferromagnetic layer.

Therefore, although the writing resolution may be degraded due to the increased media thickness, the reading resolution is not, since cancellation of the signals from the lower layers occurs which may also explain the improved isolated wave medium SNR Siso/Nm over the magnetic recording medium having the single ferromagnetic layer. The isolated wave medium SNR Siso/Nm of the magnetic recording medium having the two exchange-coupled ferromagnetic layers and very low effective Mrδ is especially improved over that of the magnetic recording medium having the single ferromagnetic layer. Such a very low effective Mrδ can be achieved when the two ferromagnetic layers have almost the same Mrδ. For the magnetic recording medium having the three exchange-coupled ferromagnetic layers, the performance is enhanced when the sum of the thicknesses of the bottom first and middle second ferromagnetic layers is not so different from the thickness of the top third ferromagnetic layer. This phenomenon is consistent with a similar phenomenon which occurs in double uncoupled layers since the best thickness combination of the double uncoupled layers is when both layers are of the same thickness.

Figure 19:
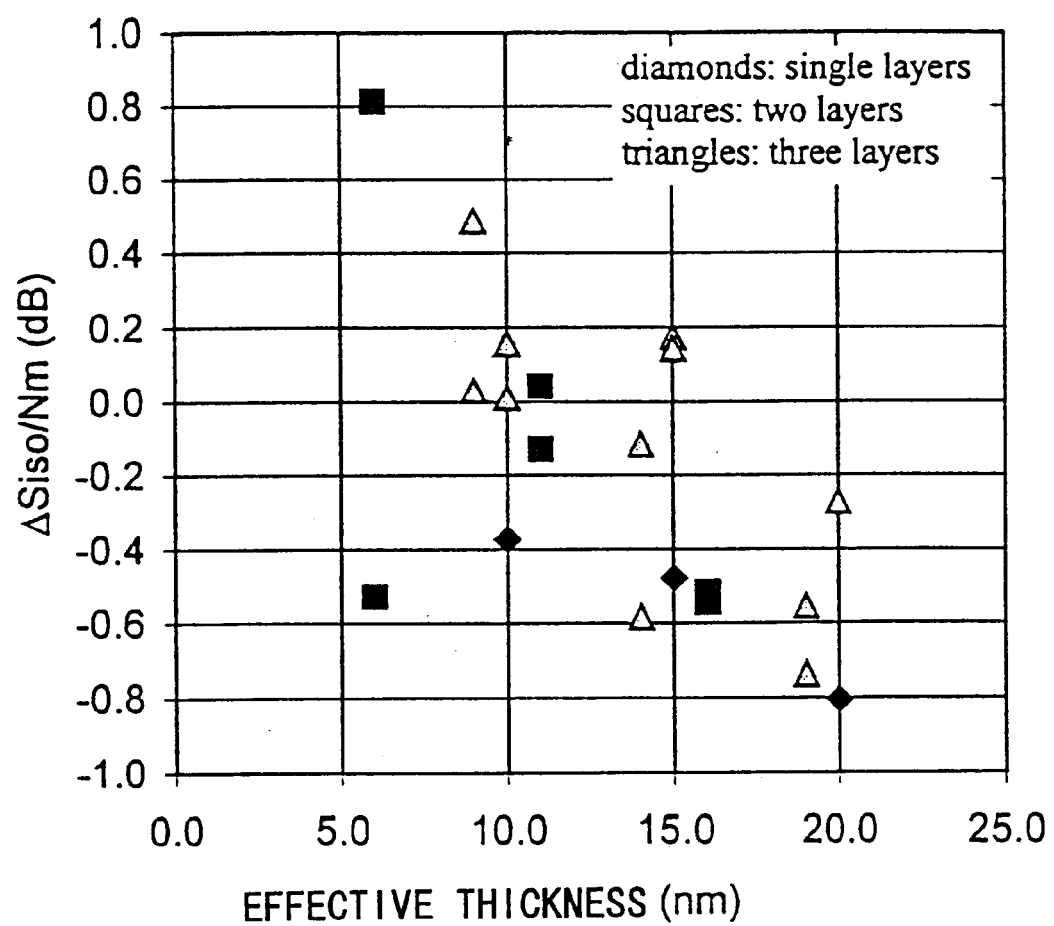
FIG. 19 is a diagram showing the effective thickness dependence of the change in isolated wave medium SNR.

FIG. 19 is a diagram showing the effective thickness dependence of the change in isolated wave medium SNR. In FIG. 19, the ordinate indicates the change ΔSiso/Nm (dB) of the isolated wave medium SNR Siso/Nm, and the abscissa indicates the effective thickness (nm) of the ferromagnetic layers. In FIG. 19, the same symbols ♦, ■ and Δ are used to indicate the data of the three different magnetic recording media as in FIG. 18. It may be seen from FIG. 19 that good isolated wave medium SNR Siso/Nm is especially observed for the magnetic recording medium having the two exchange-coupled ferromagnetic layers with low Mrδ. Although the total thickness of the ferromagnetic layers in this case becomes greater than that of the magnetic recording medium having the single ferromagnetic layer, the read-write performance is hardly degraded, and in some cases even improved.

The present inventors have also found that, when at least one of the ferromagnetic layers of the magnetic layer structure is made up of a plurality of ferromagnetic sublayers which are in contact with each other and ferromagnetically coupled, a good performance is obtained especially when the lower ferromagnetic layers is Cr-rich such that the Cr content is 23 at % or greater, and the Cr content of the upper ferromagnetic layer is less. This indicates the crucial role of the lower ferromagnetic layer. According to the experiments conducted by the present inventors, it was found that the noise arising from imperfections in the lower ferromagnetic layer is effectively reduced due to cancellation from the succeeding ferromagnetic layers. In other words, it may be regarded that the lower layers form a large source of noise, but this embodiment can improve the SNR because the signals from the lower layers are cancelled such that most of the signals and thus also noise come from the upper layers. of the signals and thus also noise come from the upper layers.

A third embodiment of the magnetic recording medium according to the present invention is based on the above findings.

In other words, in this third embodiment, the magnetic recording medium comprises a substrate, an underlayer disposed above the substrate, and a magnetic layer structure including at least a bottom ferromagnetic layer provided on the underlayer and having a remanent magnetization and thickness product $Mr_i\delta_i$, and a top ferromagnetic layer disposed above the bottom ferromagnetic layer and having a remanent magnetization and thickness product $Mr_j\delta_j$, wherein a relationship $Mr\delta \approx \Sigma(Mr_i\delta_i - Mr_j\delta_j)$ is satisfied, where $M\delta$ denotes a total remanent magnetization and thickness product of the magnetic layer structure, so that magnetization directions of adjacent ferromagnetic layers in the magnetic layer structure are closely antiparallel. $\delta$, $\delta_i$, and $\delta_j$ may be regarded as effective thicknesses.

The magnetic recording medium may further comprise a non-magnetic coupling layer interposed between two adjacent ferromagnetic layers of the magnetic layer structure, so that antiparallel magnetic interaction is induced thereby. This non-magnetic coupling layer may be made essentially of Ru with a thickness of approximately 0.4 to 1.0 nm. This non-magnetic coupling layer may be made of a material selected from a group of Ru, Rh, Ir, Cu, Cr and alloys thereof.

In the magnetic recording medium, each of the ferromagnetic layers of the magnetic layer structure may be made of a material selected from a group of Co, Fe, Ni, CoCrTa, CoCrPt and CoCrPt-M, where M=B, Cu, Mo, Nb, Ta, W and alloys thereof. In addition, at least one of the ferromagnetic layers of the magnetic layer structure may made up of a plurality of ferromagnetic layers which are in contact with each other and ferromagnetically coupled. The $Mr_j\delta_j$ of the top ferromagnetic layer may be largest among products of remanent magnetization and thickness of other ferromagnetic layers of the magnetic layer structure. Furthermore, the ferromagnetic layers of the magnetic layer structure may have mutually different compositions.

According to this third embodiment of the magnetic recording medium, the thermal stability and the isolated wave medium SNR Siso/Nm respectively are larger than those obtained by a magnetic recording medium with similar $Mr\delta$ but having single or multiple magnetic layers of closely parallel magnetizations. Further, the PW50 value is smaller than that obtained by a magnetic recording medium having a similar total magnetic layer thickness.

In addition, the dHc/dT value obtained in this third embodiment of the magnetic recording medium is smaller than that of the magnetic recording medium with similar $M\delta$ but having single or multiple magnetic layers of closely parallel magnetizations.

Furthermore, it was confirmed from data such as those shown in FIGS. 16 and 17 that the ferromagnetic coupling obtained in this third embodiment of the magnetic recording medium is sufficiently strong and closely antiparallel in a temperature range of approximately −10° C. to 150° C.

Of course, the embodiment of the magnetic storage apparatus described above may also use one or more magnetic recording media according to the third embodiment of the magnetic recording medium described above.

Next, a description will be given of an embodiment of a recording method according to the present invention. This embodiment of the recording method uses any one of the embodiments of the magnetic recording medium described above, to magnetically record information on the magnetic recording medium in the embodiment of the magnetic storage apparatus described above.

More particularly, the method of magnetically recording information on the magnetic recording medium, comprises a step of switching magnetization direction of at least one of the ferromagnetic layers which form the magnetic layer structure of the magnetic recording medium and have antiparallel magnetization directions, as in the third embodiment of the magnetic recording medium. According to this embodiment, it is possible to make a high-density recording with improved thermal stability.

Next, a description will be given of an embodiment of a method of producing the magnetic recording medium according to the present invention.

When producing any one of the embodiments of the magnetic recording medium described above, the crystal properties and crystal orientation of the layers forming the magnetic recording medium must be appropriately controlled. The non-magnetic coupling layer in particular is extremely thin compared to the other layers such as the underlayer, and it is desirable that such a thin non-magnetic coupling layer is uniformly grown. Furthermore, in order to achieve the proper ferromagnetic coupling, the interfaces between two adjacent layers must be extremely clean and include no notable abnormalities.

Accordingly, in this embodiment of the medium producing method, the layers of the magnetic recording medium are formed continuously, preferably by sequential (or continuous) sputtering, since the sputtering enables an extremely thin and uniform layer to be grown as compared to other layer formation techniques. In addition, it is possible to minimize contamination between the adjacent layers by employing the sequential (or continuous) sputtering.

Furthermore, even in the case of the sputtering, it is difficult to guarantee uniform growth of a thin film having a thickness on the order of approximately 1 nm or less. Based on experiments conducted by the present inventors, the sputtering rate is preferably set to 0.35 nm/s or less in order to guarantee the uniformity of the grown thin film.

Moreover, when the gas pressure during the sputtering is too high, the layers and the interface between the adjacent layers are easily contaminated. On the other hand, when the gas pressure during the sputtering is too low, unstable plasma causes non-uniform growth of the thin film. According to experiments conducted by the present inventors, the gas pressure during the sputtering is preferably set on the order of approximately 5 mTorr.

In addition, the substrate temperature during the sputtering also needs to be optimized. A substrate temperature which is too high may cause the substrate to warp, thereby causing non-uniform growth of particularly the thin non-magnetic coupling layer. On the other hand, a substrate temperature which is too low may cause layers having unsatisfactory crystal properties to be grown. According to experiments conducted by the present inventors, the substrate temperature prior to the sputtering is set in a range of approximately 100° C. to 300° C.

Figure 20:
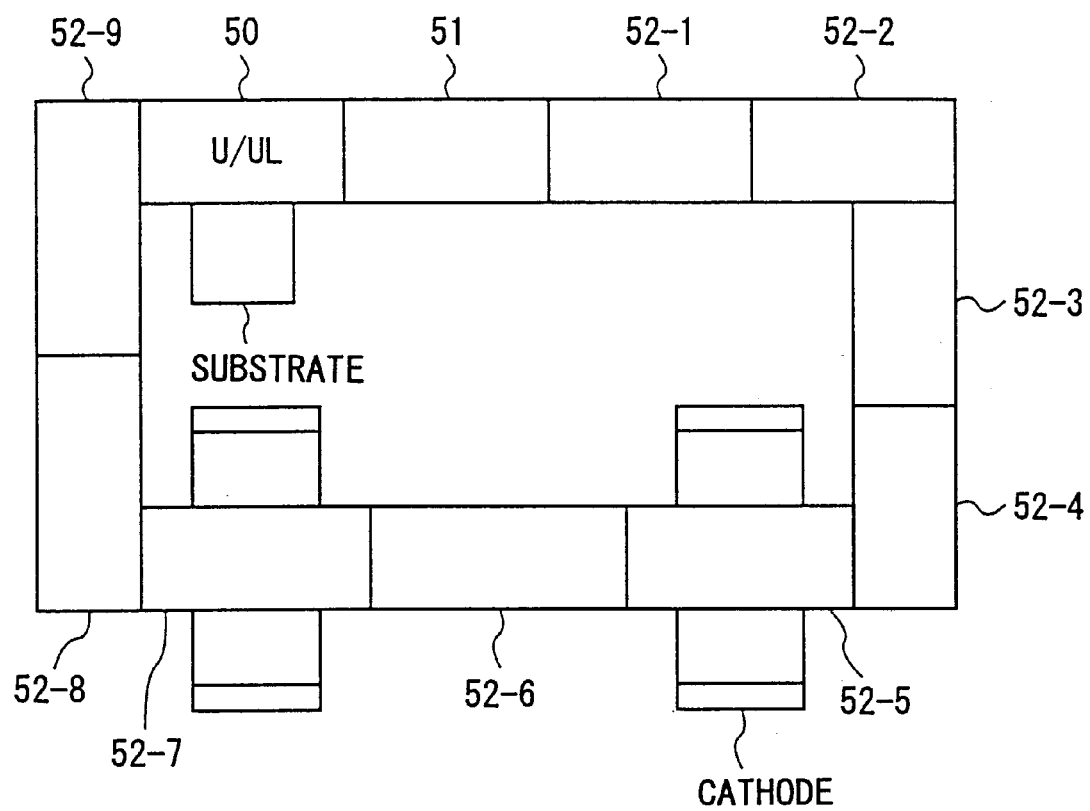
FIG. 20 is a diagram showing the general construction of a magnetic recording medium producing apparatus.

FIG. 20 is a diagram showing the general construction of a magnetic recording medium producing apparatus which is used in this embodiment of the medium producing method. The apparatus shown in FIG. 20 generally includes a loading and unloading unit 50, a heating chamber 51, and a plurality of sputtering chambers 52-1 through 52-n, where n depends on the layer structure of the magnetic recording medium which is produced. The last sputtering chamber 52-n connects to the loading and unloading unit 50 so as to enable unloading of the produced magnetic recording medium. For the sake of convenience, it is assumed that n=9.

First, a substrate is loaded into the loading and unloading unit 50 and heated to a substrate temperature in a range of approximately 100° C. to 300° C. within the heating chamber 51. Then, sequential (or continuous) DC sputtering is successively carried out in the sputtering chambers 52-1 through 52-9 to form on the substrate a NiAl layer which is 40 nm thick, a CrMo underlayer which is 20 nm thick, a CoCr intermediate layer which is 1.5 nm thick, a CoCrPtB ferromagnetic layer which is 4 nm thick, a Ru non-magnetic coupling layer which is 0.8 nm thick, a CoCrPtB ferromagnetic layer which is 4 nm thick, a Ru non-magnetic coupling layer which is 0.8 nm thick, a CoCrPtB magnetic layer, and a C protection layer.

The Ar gas pressure in the sputtering chambers 52-1 through 52-9 are set to approximately 5 mTorr. In addition, the sputtering rate is set approximately 0.35 nm/s or less and slower in the sputtering chambers 52-5 and 52-7 than in the other sputtering chambers. The slower sputtering rate can be achieved by increasing the distance between the target and the substrate by increasing the separation of the cathodes, as shown for the sputtering chamber 52-5 and 52-7.

Figure 21:
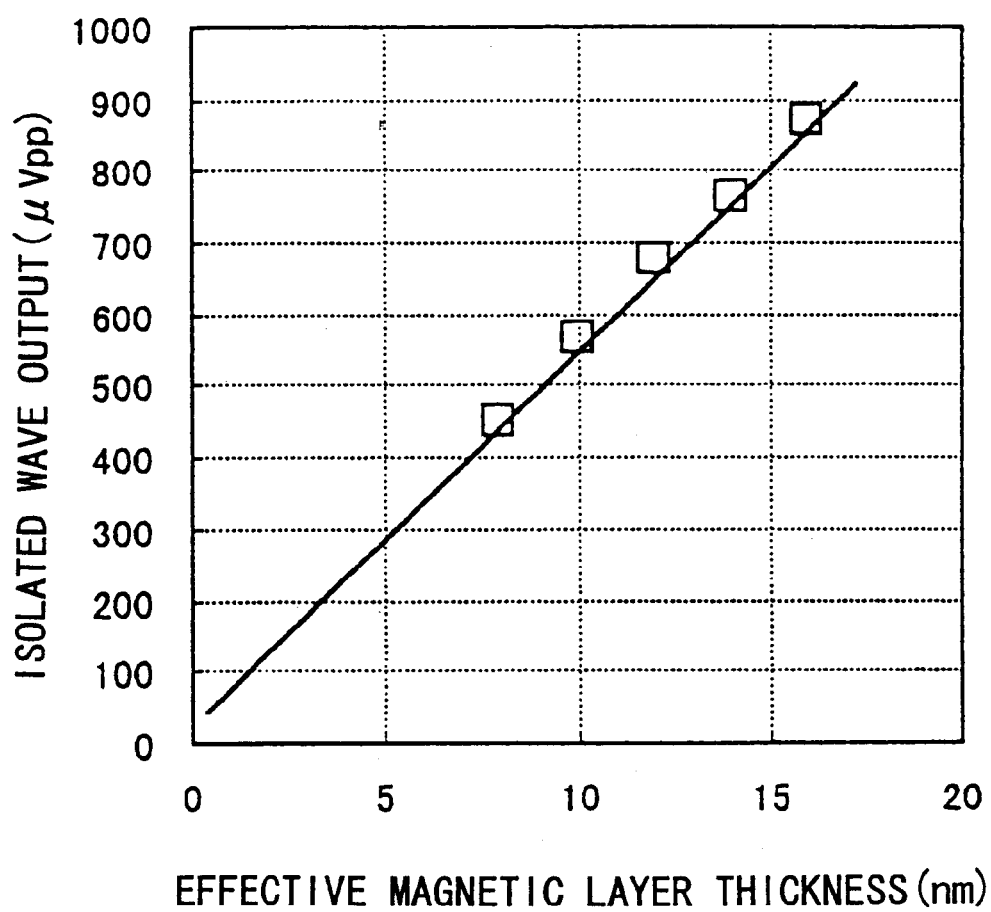
FIG. 21 is a diagram showing the dependence of isolated wave output on magnetic layer thickness.

FIG. 21 is a diagram showing the dependence of isolated wave output on effective magnetic layer thickness. In FIG. 21, the ordinate indicates the isolated wave output ($\mu$Vpp), and the abscissa indicates the effective magnetic layer thickness (nm). The data shown in FIG. 21 was obtained by writing signals on the produced magnetic recording medium and reading the written signal using a GMR head. It was confirmed that the isolated wave output is proportional to the effective magnetic layer thickness, verifying the antiparallel ferromagnetic coupling of the magnetic layer structure.

Figure 22:
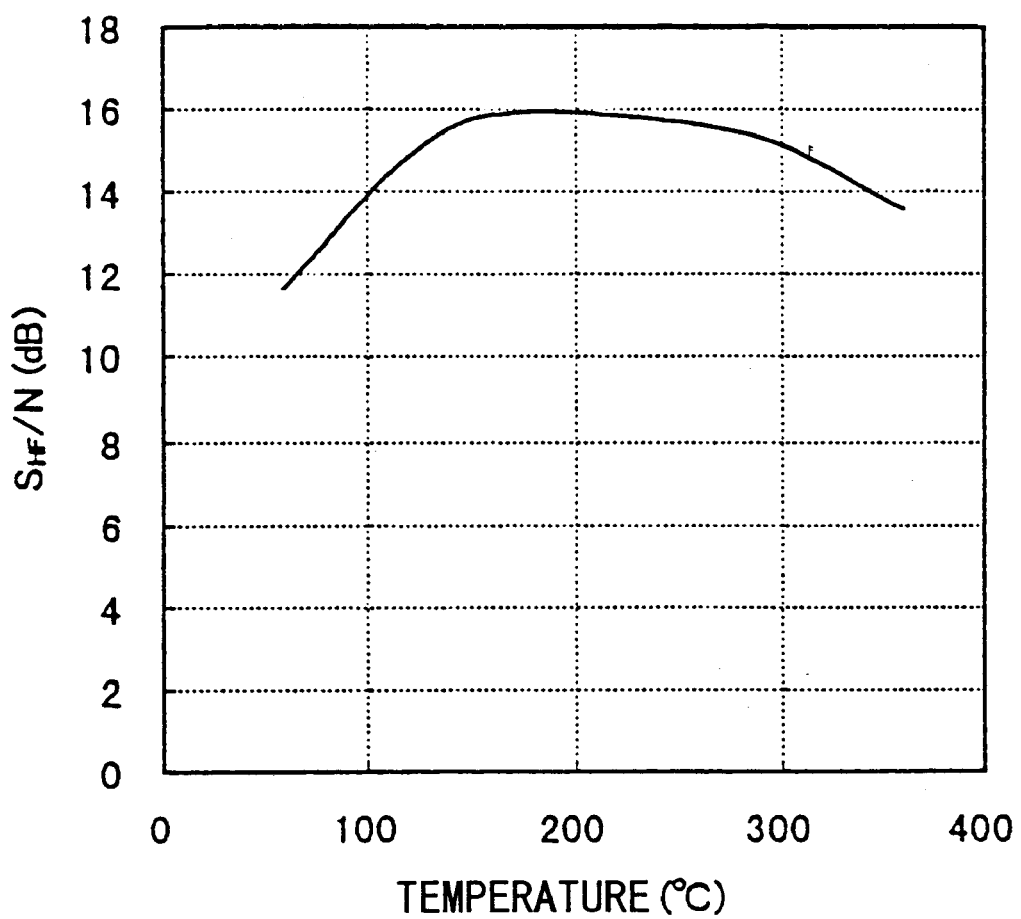
FIG. 22 is a diagram showing the temperature dependence of high-frequency SNR.

FIG. 22 is a diagram showing the temperature dependence of high-frequency SNR. In FIG. 22, the ordinate indicates the high-frequency SNR (dB), and the abscissa indicates the substrate temperature (° C.) during the sputtering. It was confirmed that good properties of the grown layers are obtained, preferably when the substrate temperature is set in a range of approximately 100° C. to 300° C.

Figure 23:
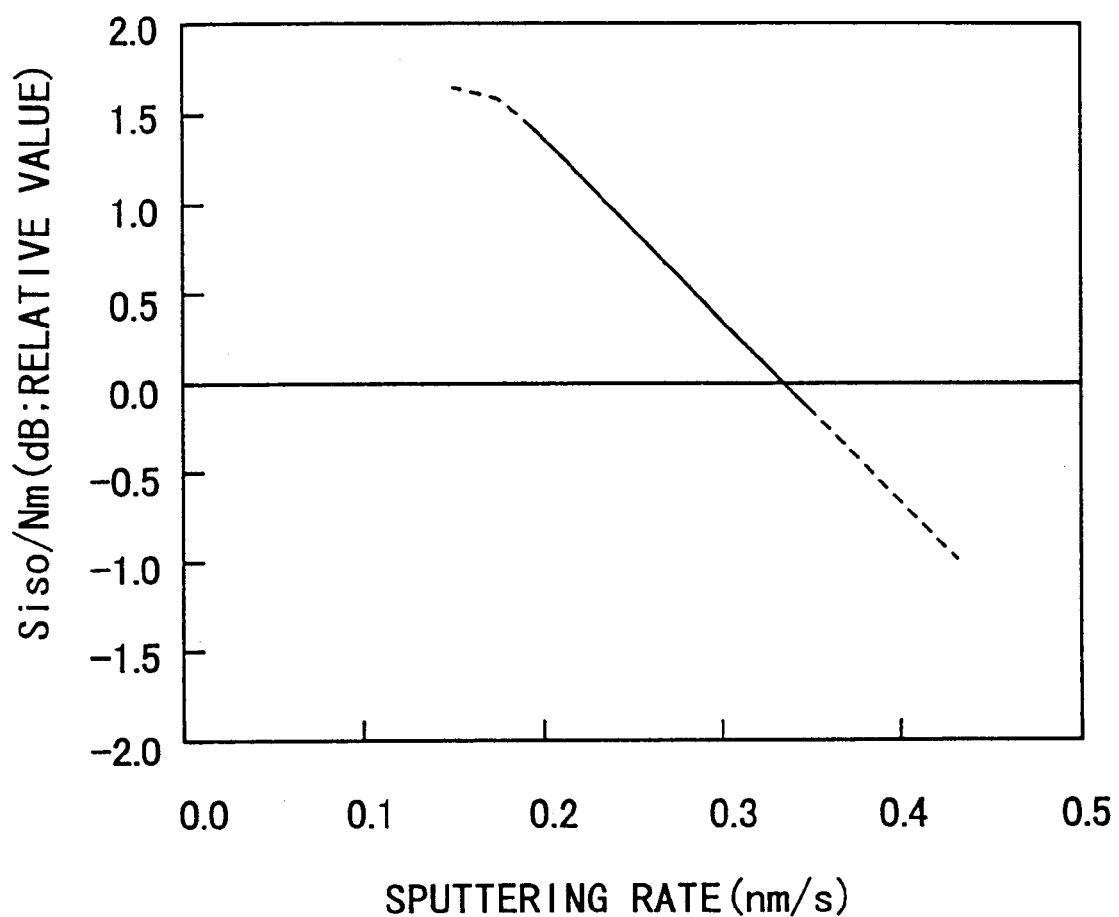
FIG. 23 is a diagram showing a relation ship of the isolated wave medium SNR Siso/Nm and the sputtering rate of Ru.

FIG. 23 is a diagram showing a relation ship of the isolated wave medium SNR Siso/Nm and the sputtering rate of Ru. In FIG. 23, the ordinate indicates the isolated wave medium SNR Siso/Nm (dB, relative value), and the abscissa indicates the sputtering rate (nm/s). The data shown in FIG. 23 were obtained to confirm whether or not the ferromagnetic layer and the magnetic layer respectively provided under and above the Ru layer would form a norm magnetic coupling. For the sake of convenience, the data shown in FIG. 23 were obtained for a case where the Ru layer is formed to a thickness of 1.4 nm on the CCPB ferromagnetic layer, and the CCPB magnetic layer is formed on the Ru layer.

In FIG. 23, the isolated wave medium SNR Siso/Nm is indicated by a relative value with respect to a comparison model medium having no Ru layer. It may be seen from FIG. 23 that the isolated wave medium SNR Siso/Nm deteriorates as the sputtering rate of Ru increases. This indicates that the extremely thin Ru layer is not formed uniformly at high sputtering rates. FIG. 23 indicates that the isolated wave medium SNR Siso/Nm becomes poorer than that of the comparison model medium having no Ru layer, particularly when the sputtering rate of Ru becomes greater than 0.35 nm/s. Therefore, it was confirmed that the sputtering rate of Ru should be set to 0.35 nm/s or less in order to produce a magnetic recording medium having the high performance described above.

Further, the present invention is not limited to these embodiments, but various variations and modifications may be made without departing from the scope of the present invention.

What is claimed is:

1. A magnetic recording medium comprising:
    at least two exchange layer structures, defined as a first exchange layer structure and a second exchange layer structure; and
    a magnetic layer formed on said second exchange layer structure, whereby said second exchange layer structure is interposed between said first exchange layer structure and said magnetic layer,
    wherein each of said exchange layer structures includes:
        a ferromagnetic layer; and
        a non-magnetic coupling layer provided on said ferromagnetic layer, and
        further wherein said ferromagnetic layer of said second exchange layer structure has a magnetic anisotropy lower than that of said ferromagnetic layer of said first exchange layer structure, and magnetizations of said ferromagnetic layers of said first and second exchange layer structures are antiparallel.

2. The magnetic recording medium as claimed in claim 1, wherein each of said ferromagnetic layers is made of a material selected from a group consisting of Co, Ni, Fe, Ni-based alloys, Fe-based alloys, and Co-based alloys.

3. The magnetic recording medium as claimed in claim 1, wherein each of said ferromagnetic layers has a thickness in a range of 2 to 10 nm.

4. The magnetic recording medium as claimed in claim 1, wherein each of said non-magnetic coupling layers is made of a material selected from a group consisting of Ru, Rh, Ir, Ru-based alloys, Rh-based alloys, and Ir-based alloys.

5. The magnetic recording medium as claimed in claim 1, wherein each of said non-magnetic coupling layers has a thickness in a range of 0.4 to 1.0 nm.

6. The magnetic recording medium as claimed in claim 1, wherein each of said magnetic layers is made of a material selected from a group consisting of Co and Co-based alloys.

7. The magnetic recording medium as claimed in claim 1, which further comprises:
    a substrate; and
    an underlayer provided above said substrate,
    said exchange layer structures being provided above said underlayer.

8. The magnetic recording medium as claimed in claim 7, which further comprises:
    a non magnetic intermediate layer interposed between said underlayer and said exchange layer structures,
    said non-magnetic intermediate layer having an hcp structure alloy consisting of CoCr-M, where M=B, Mo, Nb, Ta, W or alloys thereof, and having a thickness in a range of 1 to 5 nm.

9. The magnetic recording medium as claimed in claim 7, which further comprises:
    a NiP layer interposed between said substrate and said underlayer, said NiP layer being mechanically textured or oxidized.

10. The magnetic recording medium as claimed in claim 7, wherein said underlayer is made of a B2 structure alloy selected from a group consisting of NiAl and FeAl.

11. The magnetic recording medium as claimed in claim 1, wherein a remanent magnetization and thickness product of said ferromagnetic layer, of said second exchange layer structure is smaller than that of said ferromagnetic layer of said first exchange layer structure.

12. A magnetic storage apparatus comprising:
at least one magnetic recording medium including at least two exchange layer structures, defined as a first exchange layer structure and a second exchange layer structure; and
a magnetic layer formed on said second exchange layer structure, whereby said second exchange layer structure is interposed between said first exchange layer structure and said magnetic layer, wherein each of said exchange layer structures includes:
a ferromagnetic layer; and
a non-magnetic coupling layer provided on said ferromagnetic layer, and
further wherein said ferromagnetic layer of said second exchange layer structure has a magnetic anisotropy lower than that of said ferromagnetic layer of said first exchange layer structure, and magnetizations of said ferromagnetic layers of said first and second exchange layer structures are antiparallel.

13. A magnetic recording medium comprising:
a magnetic layer;
a first exchange layer structure; and
a second exchange layer structure provided between said first exchange layer structure and said magnetic layer, wherein a ferromagnetic layer of said second exchange layer structure has a magnetic anisotropy lower than that of a ferromagnetic layer of said first exchange layer structure, and magnetizations of the ferromagnetic layers of said first and second exchange layer structures are antiparallel.

14. A magnetic storage apparatus comprising:
at least one magnetic recording medium including a magnetic layer, a first exchange layer structure, and a second exchange layer structure provided between said first exchange layer structure and said magnetic layer, wherein a ferromagnetic layer of said second exchange layer structure has a magnetic anisotropy lower than that of a ferromagnetic layer of said first exchange layer structure, and magnetizations of the ferromagnetic layers of said first and second exchange layer structure are antiparallel.

15. A magnetic recording medium comprising:
a substrate;
an underlayer disposed above said substrate; and
a magnetic layer structure including at least a bottom ferromagnetic layer provided on the underlayer and having a remanent magnetization and thickness product $Mr_i\delta_i$, and a top ferromagnetic layer disposed above the bottom ferromagnetic layer and having a remanent magnetization and thickness product $Mr_j\delta_j$, wherein a relationship $Mr\delta \approx \Sigma(Mr_i\delta_i - Mr_j\delta_j)$ is satisfied, where $Mr\delta$ denotes a total remanent magnetization and thickness product of the magnetic layer structure, so that magnetization directions of adjacent ferromagnetic layers in the magnetic layer structure are antiparallel, wherein at least one of the ferromagnetic layers of the magnetic layer structure is made up of a plurality of ferromagnetic sub-layers which are in contact with each other and ferromagnetically coupled.

16. The magnetic recording medium as claimed in claim 15, which further comprises:
a non-magnetic coupling layer interposed between adjacent ferromagnetic layers of the magnetic layer structure, so that antiparallel magnetic interaction is induced thereby.

17. The magnetic recording medium as claimed in claim 16, wherein said non-magnetic coupling layer is made of Ru with a thickness of approximately 0.4 to 1.0 mn.

18. The magnetic recording medium as claimed in claim 16, wherein said non-magnetic coupling layer is made of a material selected from a group consisting of Ru, Rh, Ir, Cu, Cr and alloys thereof.

19. The magnetic recording medium as claimed in claim 13, wherein each of the ferromagnetic layers of the magnetic layer structure is made of a material selected from a group consisting of Co, Fe, Ni, CoCrTa, CoCrPt and CoCrPt-M, where M=B, Cu, Mo, Nb, Ta, W and alloys thereof.

20. The magnetic recording medium as claimed in claim 15, wherein the $Mr_j\delta_j$ of the top ferromagnetic layer is largest among remanent magnetization and thickness products of other ferromagnetic layers of the magnetic layer structure.

21. The magnetic recording medium as claimed in claim 15, wherein the ferromagnetic layers of the magnetic layer structure have mutually different compositions.

22. A magnetic storage apparatus comprising:
at least one magnetic recording medium including a substrate, an underlayer disposed above said substrate, and a magnetic layer structure,
said magnetic layer structure including at least a bottom ferromagnetic layer provided on the underlayer and having a remanent magnetization and thickness product $Mr_i\delta_i$, and a top ferromagnetic layer disposed above the bottom ferromagnetic layer and having a remanent magnetization and thickness product $Mr_j\delta_j$,
wherein a relationship $Mr\delta \approx \Sigma(Mr_i\delta_i - Mr_j\delta_j)$ is satisfied, where $Mr\delta$ denotes a total remanent magnetization and thickness product of the magnetic layer structure, so that magnetization directions of adjacent ferromagnetic layers in the magnetic layer structure are antiparallel,
wherein at least one of the ferromagnetic layers of the magnetic layer structure is made up of a plurality of ferromagnetic layers which are in contact with each other and ferromagnetically coupled.

23. A method of magnetically recording information on a magnetic recording medium, comprising:
a substrate;
an underlayer disposed above said substrate; and
a magnetic layer structure including at least a bottom ferromagnetic layer provided on the underlayer and having a remanent magnetization and thickness product $Mr_i\delta_i$, and a top ferromagnetic layer disposed above the bottom ferromagnetic layer and having a remanent magnetization and thickness product $Mr_j\delta_j$, wherein a relationship $Mr\delta \approx \Sigma(Mr_i\delta_i - Mr_j\delta_j)$ is satisfied, where $Mr\delta$ denotes a total remanent magnetization and thickness product of the magnetic layer structure, so that magnetization directions of adjacent ferromagnetic layers in the magnetic layer structure are antiparallel,
wherein at least one of the ferromagnetic layers of the magnetic layer structure is made up of a plurality of ferromagnetic sub-layers which are in contact with each other and ferromagnetically coupled;

wherein said method includes a step of switching magnetization direction of at least one of the ferromagnetic layers which form a magnetic layer structure of the magnetic recording medium such that said switched ferromagnetic layer and at least one of said other ferromagnetic layers have antiparallel magnetization directions.

24. A method of producing a magnetic recording medium having a substrate, an underlayer and a magnetic layer structure, comprising the steps of:
(a) forming the magnetic layer structure to include at least a bottom ferromagnetic layer provided on the underlayer and having a remanent magnetization and thickness product $Mr_i\delta_i$, and a top ferromagnetic layer disposed above the bottom ferromagnetic layer and having a remanent magnetization and thickness product $Mr_j\delta_j$, wherein a relationship $Mr\delta \approx \Sigma(Mr_i\delta_i - Mr_j\delta_j)$ is satisfied, where $Mr\delta$ denotes a total remanent magnetization and thickness product of the magnetic layer structure, so that magnetization directions of adjacent ferromagnetic layers in the magnetic layer structure are antiparallel, wherein at least one of the bottom ferromagnetic layer and the top ferromagnetic layer is formed of a plurality of ferromagnetic layers which are in contact with each other and ferromagnetically coupled; and
(b) forming the underlayer and the magnetic layer structure by sequential sputtering.

25. The method of producing the magnetic recording medium as claimed in claim 24, which further comprises the step of:
(c) heating a substrate of the magnetic recording medium to approximately 100 to 300° C. prior to sputtering.

26. The method of producing the magnetic recording medium as claimed in claim 24, wherein said step (b) forms each ferromagnetic layer of the magnetic layer structure at a sputtering rate of 0.35 nm/s or less.

27. The method of magnetically recording information on the magnetic recording medium as claimed in claim 23, wherein said step switches the magnetization direction of at least one of the ferromagnetic layers which have a non-magnetic coupling layer interposed therebetween.

28. The method of magnetically recording information on the magnetic recording medium as claimed in claim 27, wherein said non-magnetic coupling layer is made of a material selected from a group consisting of Ru, Rh, Ir, Ru alloys, Rh alloys, and Ir alloys.

29. The method of magnetically recording information on the magnetic recording medium as claimed in claim 27, wherein said non-magnetic coupling layer has a thickness in a range of 0.4 to 1.0 nm.

30. The method of magnetically recording information on the recording medium as claimed in claim 27, wherein each of said ferromagnetic layers is made of a material selected from a group consisting of Co, Ni, Fe, Ni alloys, Fe alloys, and Co alloys.

31. The method of magnetically recording information on the magnetic recording medium as claimed in claim 27, wherein said ferromagnetic layers are made of material selected from a group consisting of CoCrTa, CoCrPt and CoCrPt-M, where M=B, Mo, Nb, Ta, W, Cu or alloys thereof.

32. The magnetic recording medium as claimed in claim 1, wherein said ferromagnetic layer is made of a material selected from a group consisting of CoCrTa, CoCrPt and CoCrPt-M, where M=B, Mo, Nb, Ta, W, Cu or alloys thereof.

33. The magnetic recording medium as claimed in claim 1, wherein said magnetic layer is made of a material selected from a group consisting of CoCrTa, CoCrPt and CoCrPt-M, where M=B, Mo, Nb, Ta, W, Cu or alloys thereof.

* * * * *

UNITED STATES PATENT AND TRADEMARK OFFICE
CERTIFICATE OF CORRECTION

PATENT NO. : 6,753,101 B1  
DATED : June 22, 2004  
INVENTOR(S) : Abarra et al.

It is certified that error appears in the above-identified patent and that said Letters Patent is hereby corrected as shown below:

Title page,  
Item [56], References Cited, OTHER PUBLICATIONS,  
"Pu-Ling Lu and Stanley H. Charap", reference, delete "Indentification:" and insert -- Identification: -- therefor.  
"Y, Kawato et al.," reference, delete "Y, Kawato et al.;" and insert -- Y. Kawato et al; -- therefor.

Column 17,  
Line 6, delete "layer," and insert -- layer -- therefor.  
Line 61, delete "≈" and insert -- ≅ -- therefor.

Column 18,  
Line 17, delete "13" and insert -- 15 -- therefor.  
Line 39, delete "≈" and insert -- ≅ -- therefor.  
Line 59, delete "≈" and insert -- ≅ -- therefor.

Column 19,  
Line 17, delete "≈" and insert -- ≅ -- therefor.

Column 20,  
Line 23, delete "made of material" and insert -- made of a material --.

Signed and Sealed this

Twenty-fifth Day of January, 2005

JON W. DUDAS  
*Director of the United States Patent and Trademark Office*